(12) United States Patent
Teow et al.

(10) Patent No.: US 8,689,347 B2
(45) Date of Patent: Apr. 1, 2014

(54) CRYPTOGRAPHIC CONTROL FOR MOBILE STORAGE MEANS

(75) Inventors: Kha Sin Teow, Toronto (CA); Ernest Dainow, Toronto (CA); Leonid Nikolaev, Mississauga (CA); Daniel Thanos, Mississauga (CA)

(73) Assignee: CryptoMill Inc., St. Michael (BB)

( * ) Notice: Subject to any disclaimer, the term of this patent is extended or adjusted under 35 U.S.C. 154(b) by 617 days.

(21) Appl. No.: 11/914,312

(22) PCT Filed: May 15, 2006
(Under 37 CFR 1.47)

(86) PCT No.: PCT/CA2006/000771
§ 371 (c)(1),
(2), (4) Date: Aug. 6, 2008

(87) PCT Pub. No.: WO2006/119637
PCT Pub. Date: Nov. 16, 2006

(65) Prior Publication Data
US 2009/0217385 A1     Aug. 27, 2009

Related U.S. Application Data

(60) Provisional application No. 60/680,492, filed on May 13, 2005.

(51) Int. Cl.
*G06F 21/00* (2013.01)
(52) U.S. Cl.
USPC .......... 726/27; 726/4; 726/9; 726/20; 726/29; 713/172; 713/185; 713/193
(58) Field of Classification Search
USPC ......... 726/4, 9, 20, 27–29; 713/172, 185, 193
See application file for complete search history.

(56) References Cited

U.S. PATENT DOCUMENTS

| 5,915,019 A * | 6/1999 | Ginter et al. ............. 705/54 |
| 2002/0010827 A1 | 1/2002 | Cheng |

(Continued)

FOREIGN PATENT DOCUMENTS

| CN | 1384964 | 12/2002 |
| JP | 2001-195309 | 7/2001 |

(Continued)

OTHER PUBLICATIONS

Product review: Block unauthorized personal computer devices access with DeviceLock, Oct. 27, 2003, http://articles.techrepublic.com.com/5102-1035-5084802.html.

(Continued)

*Primary Examiner* — Justin T Darrow
(74) *Attorney, Agent, or Firm* — Alexander Anishchenko; Borden Ladner Gervais LLP

(57) ABSTRACT

A system and method that regulates the various operations between computing stations and storage devices. Storage devices are the storage means that are contained upon devices that are able to have data stored upon them. Any operation that involves or may lead to the exchange or accessing of content (data) between a storage device and computing station may be regulated by means of a policy which comprise a set of rules. Rules may be defined according to specific criteria, including the type of storage device, the type of content, the attributes of the content, and other attributes associated with the storage device and/or the content. The policy will be dynamically installed upon a computing station for specific user(s) and will regulate the data operations that may take place between the computing stations and storage devices based on evaluation of the policy. Based on the evaluation of the policy, the requested operation is permitted, restricted in some areas, or denied.

14 Claims, 19 Drawing Sheets

(56) References Cited

U.S. PATENT DOCUMENTS

| | | | |
|---|---|---|---|
| 2002/0147924 A1* | 10/2002 | Flyntz | 713/200 |
| 2003/0154380 A1 | 8/2003 | Richmond et al. | |
| 2004/0103288 A1* | 5/2004 | Ziv et al. | 713/185 |
| 2004/0199515 A1 | 10/2004 | Penny et al. | |
| 2004/0236958 A1* | 11/2004 | Teicher et al. | 713/193 |
| 2005/0005170 A1 | 1/2005 | Camenisch et al. | |
| 2005/0015608 A1 | 1/2005 | Peterson | |
| 2005/0066069 A1 | 3/2005 | Kaji | |
| 2005/0182925 A1* | 8/2005 | Tsukamura | 713/158 |
| 2005/0213763 A1* | 9/2005 | Owen et al. | 380/270 |
| 2007/0214369 A1* | 9/2007 | Roberts et al. | 713/192 |

FOREIGN PATENT DOCUMENTS

| | | |
|---|---|---|
| JP | 2002-132457 | 5/2002 |
| JP | 2003-114830 | 4/2003 |
| JP | 2004-192601 | 7/2004 |
| JP | 2005-56418 | 3/2005 |
| JP | 2005-56429 | 3/2005 |
| JP | 2005-92745 | 4/2005 |
| JP | 2005-122474 | 5/2005 |
| JP | 2007-535718 | 12/2007 |
| WO | 0025214 | 5/2000 |
| WO | 0042491 | 7/2000 |
| WO | 2005008385 | 1/2005 |
| WO | 2005054973 | 6/2005 |

OTHER PUBLICATIONS

Gartner: iPods, other small storage devices pose security risk, Jul. 6, 2004, http://www.connputerworld.com/printthis/2004/0,4814,94319,00.html.

International Application No. PCT/CA2006/000771, International Search Report dated Oct. 16, 2006.

Kaplan, "IBM Cryptolopes, SuperDistribution and Digital Rights Management", Internet Citation, Dec. 30, 1996, XP002132994, retrieved from the Internet http://www.research.ibm.com/people/k/kaplan/cryptolope-docs/crypap/html on Mar. 14, 2000.

"Step-by-Step Guide: How to use Group Policy Management Console", Microsoft Co., Jan. 7, 2005, http://technet.microsoft.com/ja-jp/library/cc967042.aspx.

English Translation of Japanese Patent Application No. 2008-510378 Office Action mailed Jun. 7, 2011.

European Patent Application No. 06741490.4 Search Report dated Feb. 29, 2012.

European Patent Application No. 06741490.4, Office Action dated Nov. 30, 2012.

English Translation of Japanese Patent Application No. 2008-510377 Office Action mailed Jun. 7, 2011.

European Patent Application No. 06741486.2, Search Report dated Sep. 2, 2011.

English Translation of Chinese Patent Application No. 200680025366.8, Office Action dated Jun. 5, 2009.

* cited by examiner

SET PASSWORD for volume F     [INFO]

UserID: JSmith     ☑ Only     owner can login

New password     [_____]

Confirm password [_____]

[LOGIN] Change password     [CANCEL]

CRYPTOGRAPHIC CONTROL FOR MOBILE STORAGE MEANS

FIELD OF THE INVENTION

The present invention relates generally to the field of data communication, and more specifically to a method of regulating data communication between mobile storage media and computing devices.

BACKGROUND OF THE INVENTION

Conventionally, within an organization, data that was associated with a user would be stored upon the hard disk associated with a user's computer or server to which the user's computer was connected. If an individual wished to access the data stored on the disk drive, they would be required to log on to the computer to be able to access the appropriate disk drive.

In the current computing environment, the amount of data that is transferred and exchanged between organizations and between users within organizations is ever increasing. As a result, conventional disk drives are being replaced by different methodologies to store data. The need for portability of data has brought about the development of mobile storage means. Examples of these mobile storage means include USB storage means, external hard drives, CDs, and DVDs. These mobile storage means facilitate information flow between various computing devices.

However, there are risks associated with the use of these mobile storage means. Within an organization, it must be ensured that data that is proprietary to an organization must be protected from being accessed by individuals/entities who are not permitted to access the data. Through the use of mobile storage means it has become exceedingly simple for confidential and sensitive data to be accessed, modified, copied or removed by authorized or unauthorized personnel.

In order to attempt to combat the potential threat of misappropriation of data that is posed by mobile storage means, some organizations have taken to prohibiting the use of such devices. While this does combat security risks, operational efficiency and productivity is hindered, as mobile storage means are a very efficient tools for enhancing the ease of data transfer and storage. Some organizations, while realizing that an outright prohibition on using mobile storage means may not prove to be effective or efficient, have put in place policies that allow for the limited use of mobile storage means in accordance with their own security protocols. These policies however, lack an effective control mechanism which automatically enforces them, and it is left up to an end user to comply with one or more policies that relate to data transfer involving mobile storage means. Policies which do not have an automated enforcement mechanism will not be able to counter the following types of threats that are posed through the use of mobile storage means; 1) when mobile storage means containing confidential information are stolen or lost, 2) the copying of confidential data from a mobile storage means to an unauthorized computing device; and 3) the copying of confidential data from computing device to a mobile storage means.

Automatic policy enforcement mechanisms need to ensure that the threats that are posed through the use of mobile storage means as have been described above are combated, but at the same time should allow for customized policies to be designed which take into account the various data access requirements that may be required by a specific user.

SUMMARY OF THE INVENTION

A system and method that regulates the various operations between computing stations and storage devices. Computing stations may be personal desktop computers, work station computers, server computers, laptop computers, or mobile hand-held computers. Storage devices are the storage means that are contained upon devices that are able to have data stored upon them. A device may be internal to the computing device, or may be external, such that it is connected to the computing station via an external interface. Examples of devices which have storage means associated with them include USB Flash Drives, CDs, DVDs, ZIP disks, Hard Drives, Floppy disks, PCMCIA drives, Network Drives.

Any operation that involves or may lead to the exchange or accessing of content (data) between a storage device and computing station may be regulated. Operations may include, but are not limited to, reading content, writing content, copying content, deleting content, executing a file, mounting a storage device such that it is accessible to a computing device, and allowing content to be transmitted across a specific interface.

An administrator and a client application are made use of to regulate the operations that may take place between computing stations and storage device. The administrator application is installed upon a trusted computing device, such as a server, such that access is restricted to trusted users. The client application will be installed on computing devices, such that the interaction of the computing devices with the storage devices may be regulated.

The client applications will be customized for each computing device based on the operations that will be allowed between a computing device and various storage devices. The client applications are customized by means of various policies being defined. The policies that are defined, will provide a set of rules, which will govern and regulate the operations that may take place between computing stations and storage devices. Policies will be determined by the administrator or other trusted individual/entity that is making use of the administrator application.

Policies may be defined according to various rules. More specifically, rules may be specified according to the storage device type, the interface, the content type, the meta data information, the operations, and various authentication identifiers.

The storage device type may be any component that contains a storage element, that is capable of having data stored upon it. The storage device may be internally connected to the computing device, or may be external, such that it is connected by an interface. A storage device may not necessarily be one physical device, as one physical device, such as a hard drive may be considered to be comprised of one or more storage devices. A sector or section of a hard drive or any other storage means may be considered to be a storage device, even for example, one particular file stored upon a hard drive may be considered to be a storage device.

The interface is the component that provides the connectivity between the computing device and the storage device, and examples of such interfaces may include, PCI, USB, SCSI and other such buses, and other network interfaces such as Ethernet and Fibre.

The content type is the format of the content (data) that is stored upon the storage device. As there may be different types of content upon a storage device, it may be possible to define rules that are associated with specific content types, such as for example, rules based on whether the content is associated with a .jpg or .doc file type.

The metadata information relates to information about the content, and the file with which they are associated. For example, metadata information may be related to the attributes associated with the content, including the date the file was created, the file name, the owner of the file and any access permissions which may be associated with the file.

Authentication identifiers may include identifiers that are associated with a user, entity or the content itself. For example, a user identifier would allow for rules to be defined that would regulate the data operations between a computing device and a storage device for a particular user. Authentication identifiers may also include security domains and security sub domains, which allow for domains to be defined to which computing devices and storage devices may be assigned, such that rules may regulate the operations that may take place between computing devices and storage devices depending on the security domains and security sub domains to which they are assigned.

The client application would enforce the rules that have been defined and that are associated with a particular computing device. The client application will monitor all interfaces that are connected to a computing device and will determine which requests that are being made by and to storage devices for specific operations to be performed should be allowed based on the rules that have been defined.

The administrator application is also to be used for provisioning a storage device. Provisioning a storage device refers to the process by which a storage device will have encrypted information written to it, such that when an attempt is made to interface a storage device that has been provisioned with a computing device, the client application of the computing device is able to determine which, if any, operations are allowed between the storage device and the computing device based on rules the rules that have been defined.

BRIEF DESCRIPTION OF THE DRAWINGS

For a better understanding of embodiments of the systems and methods described herein, and to show more clearly how they may be carried into effect, reference will be made by way of example, to the accompanying drawings in which:

FIG. 16 is a screenshot of a sample user login menu;

DETAILED DESCRIPTION OF THE INVENTION

Figure 1:
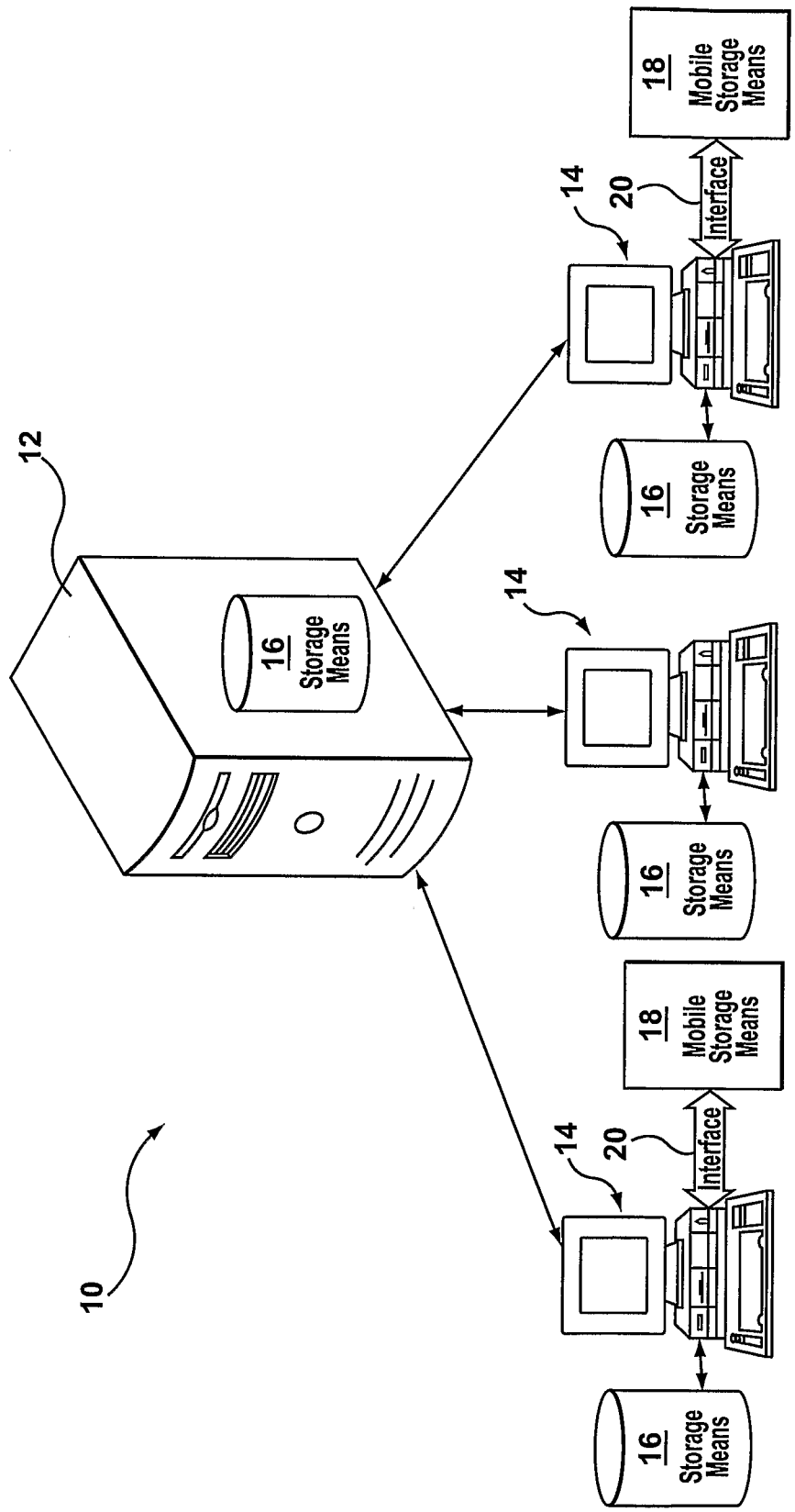
FIG. 1 is a block diagram illustrating the components of a conventional network.

Reference is made to FIG. 1 where a block diagram illustrating the various components which may be found within a conventional network 10 are shown. The conventional network 10 is used to represent the various computing devices that are found within a network that is associated with an organization, or other entity (such as a home office network). An organizational network 10 may have associated with it one or more servers 12. Servers 12 may be designed and used for various purposes. The server 12 may act as a file server, print server, web server, mail servers, LAN servers, and may generally be used when a central computer processor is required to undertake certain functionality. When a user of the conventional network 10 is connected to a server, they can access programs, files, and other information from the server. Servers that are generally employed within a network 10 are web servers, mail servers, and LAN servers. For purposes of illustration, in FIG. 1 one server is shown. However, a network 10 may have associated with it many servers 12, or one server 12 that is able to carry out various tasks.

A conventional network 10 has associated with it computing devices 14. Computing devices 14 include, but are not limited to personal desktop computers, work station computers, server computers, laptop computers or mobile/handheld computers. The computing devices 14 may be connected to the server 12 by means of a wired or wireless connection.

Each computing device 14 may have associated with it a storage means 16. The storage means 16 provides a computing device 14 and the server 12 with a mechanism for permanent storage. Computing devices 12 may generally make use of the storage means 16 that are located upon a computing device 14, or that are associated with a server 12.

As the need for data transfer increases, mobile storage means 18 are made use of. Mobile storage means 18 may include, but are not limited to: USB Flash Drives, CDs, DVDs, ZIP™ disks, iPods™, external FireWire Drives, external USB Drives, PCMCIA Flash Drives, Network Attached (wireless/wired) Drives, and hard drives. It should be noted, that files that are stored upon a storage device, or a block of content stored upon a mobile storage device may be considered as mobile storage means 18. Mobile storage means 18 provide advantages over conventional storage means 16. As an example, with USB storage means (USB is a standard port that enables the connection of a storage means to a computing device 14), USB supports data transfer rates of 480 Mbps (million bits per second), which is significantly faster that the data transfer rates that are associated with serial ports. Also, USB devices can be connected or disconnected without the need to restart the computing device 14.

In the conventional network 10, data that is stored upon storage means 16 associated with either a server 12 or a computing device 14 may be transferred to a mobile storage means 18. Servers 12 and computing devices 14 are also able to read data from the mobile storage means 18. The mobile storage means 18 are able to communicate with the servers 12 and computing devices 14 by means of an interface 20. The interface 20 provides the means of communication between the server 12 and the computing devices 14, and mobile storage means 18. Examples of interfaces that may be employed, but are not limited to PCI, USB, Firewire (IEEE 1394), ATA (IDE), SATA, SCSI and network interfaces including Ethernet, Fiber Channel, and WiFi (802.11x).

Data may be transferred between mobile storage means 18 and computing devices 14, and therefore the possibility exists that data that is stored on storage means 16 may be misappropriated and accessed by unauthorized users.

A system and method for establishing policies is provided for, which are comprised of rules that regulate operations between computing devices 14 and mobile storage means 18. The rules, as used herein, determine and regulate whether certain operations between computing devices 14 and mobile storage means 18 may be performed.

Figure 2:
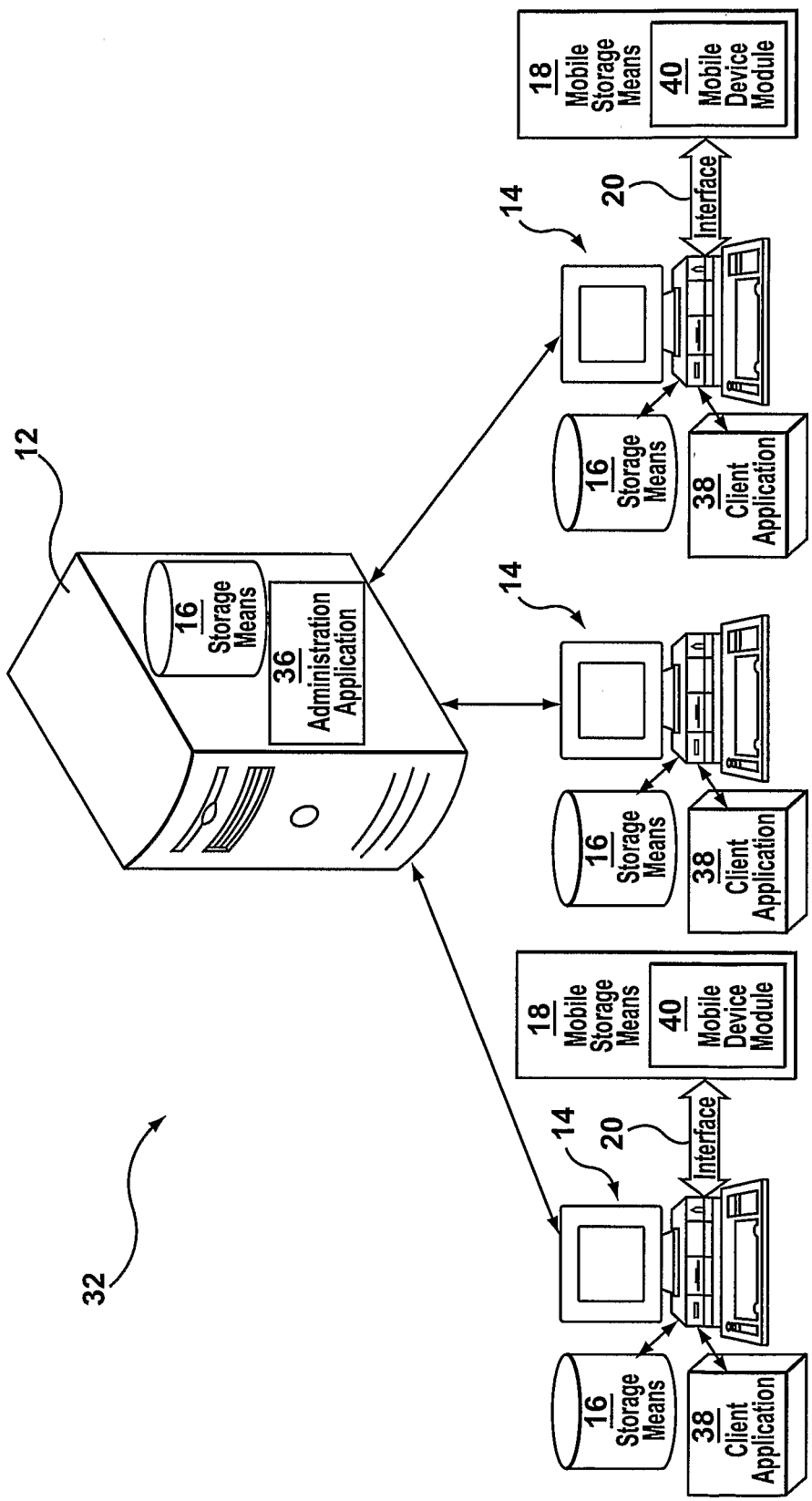
FIG. 2 is a block diagram illustrating the components of a network associated with the present invention.

Reference is now made to FIG. 2, where a network constructed in accordance with a cryptographic control system 32 of the present invention is shown. The cryptographic control system 32 controls and regulates the exchange of electronic content (data) between mobile storage means 18 and servers 12 and computing devices 14. A computing device that functions as a server 12 has installed upon it an administrator application 36. The administrator application 36 is installed upon a server 12 to which access is restricted to an administrator who is responsible for maintaining the network 30.

Each computing device 14 that is part of the cryptographic control system 32, has installed upon it, or accessible to it, a client application 38. The client application 38, is a software application is customized for a particular computing device 14 by the administrator as described in further detail below. The client application 38 as is described in further detail below, functions to control and regulate the operations between mobile storage means 18 and computing devices 14.

In the cryptographic control system 32, mobile storage means 18 may have installed upon them a mobile device module 40. Mobile storage means, upon which a mobile device module 40 has been installed, will be referred to as provisioned mobile storage means 18. Mobile storage means 18, upon which a mobile device module 40 has not been installed, will be referred to as nonprovisioned. The mobile device module 40 provides a means by which computing devices 14 within the cryptographic control system 32 can determine whether or not specific operations between a mobile storage means 18 and a computing device may be performed. The mobile device information module 40 contains encrypted data that is written upon mobile storage means 18. The encrypted data allows the computing device 14 to identify information that is associated with the mobile storage means 18, that is then used to determine whether operations between the computing device 14 and mobile storage means 18 may be performed. Also, as is explained below, all data that is written to provisioned mobile storage means 18 is encrypted. The contents of the mobile device module 40 are described in further detail below.

Figure 3:
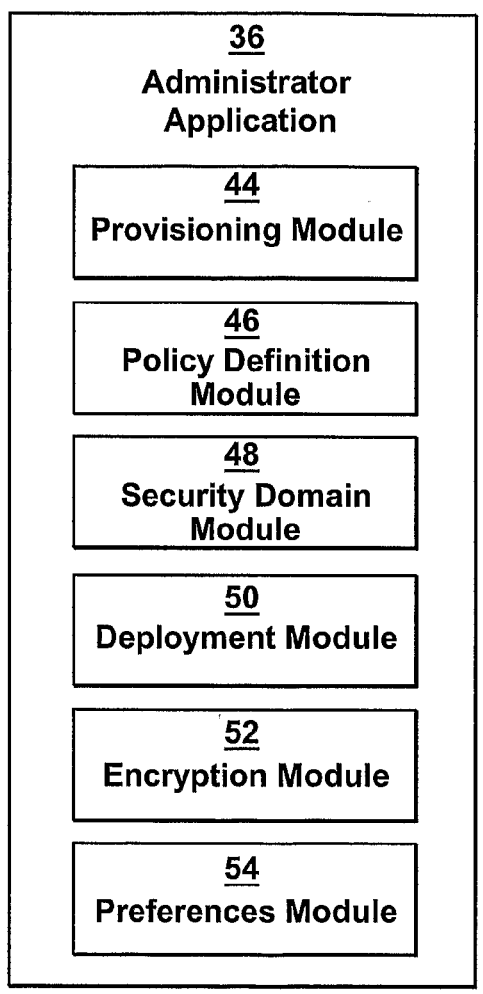
FIG. 3 is a block diagram illustrating the components of a administrator application.

Reference is now made to FIG. 3, wherein the administrator application 36, and its constituent components are shown in greater detail. The administrator application 36 is comprised of various modules, including, but not limited to a provisioning module 44, a policy definition module 46, a security domain module 48, a deployment module 50, an encryption module 52 and a preferences module 54. The provisioning module 44 is used to write the mobile device module 40 to storage contained on the mobile storage means 18, as is described below. The policy definition module 46 is used by the administrator to define various polices which are comprised of rules that will define the operations that are allowable between computing devices 14 and mobile storage means 18. Rules are used to control the various operations that may take place between computing devices 14 and mobile storage means 18. The security domain module 48 is used to define the various security domains within the cryptographic control system 32. Security domains as are described in further detail below, function as a method by which various computing devices 14 may be grouped together. For example, all computing devices 14 within an organizational network 30 may belong to one security domain, or may be split among various domains that are associated with a network 30. The deployment module 50 is used by the administrator to define a client application 38 which is to be installed on a particular computing device 14. The encryption module 52, allows the administrator to modify the encryption settings that are used with respect to encrypting the contents of the client application 38 and mobile storage module 40, as is described further below. The preferences module 54 further allows the administrator to modify and save security settings that are associated with the administrator application 36 and is described in detail below.

Figure 4:
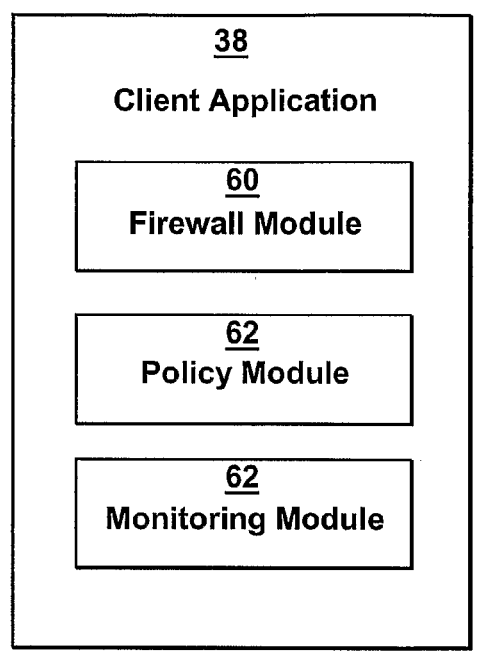
FIG. 4 is block diagram illustrating the components of a client application.

Reference is made to FIG. 4, where the constituent components of the client application 38 are shown. The client application 38 enforces the rules that have been defined with respect to the operations that may take place between a computing device 14 and a mobile storage means 18. The client application 38 monitors all interfaces 20 that connect to the computing device 14 to determine what type of operation is being attempted between the computing device 14 and mobile storage means 18. The client application 38 communicates with device drivers associated with the operating system of the computing device 14 to enforce the rules that have been defined. The client application 38, is a software application that is customized by the administrator application 36 for each computing device 14 and is installed upon a computing device 14. The client application 38, will be comprised of a firewall module 60, a policy module 62, and a monitoring module 64. The firewall module 60, as is described in further detail below, controls the operations which may take place between a computing device 14 and mobile storage means 18 by enforcing the rules which have been defined and included in policy module 62. The policy module 62 will contain the various rules that have been defined for the particular computing device 14. The monitoring module 64 is used to monitor all requests for data that are made by, and to, the computing device 14, such that the appropriate action in response as determined by the policy module 62 may be carried out. The client application 38 is cryptographically protected, and the data of the client application 38 may not be tampered with. In one embodiment, the client application 38 is cryptographically protected with a secure signature like password-based HMAC-SHA256 (FIPS180-2, Secure Hash Standard, NIST). If the client application 38 is tampered with, the change in this signature will be detected.

The operation of the cryptographic control system will be described with respect to one embodiment of the invention. After the administrator application 36 is installed, a variety of options with respect a course of action pertaining to the operation of the cryptographic control system 32 are available to chose from. The administrator application 36 is installed by employing means which are generally known.

Figure 5:
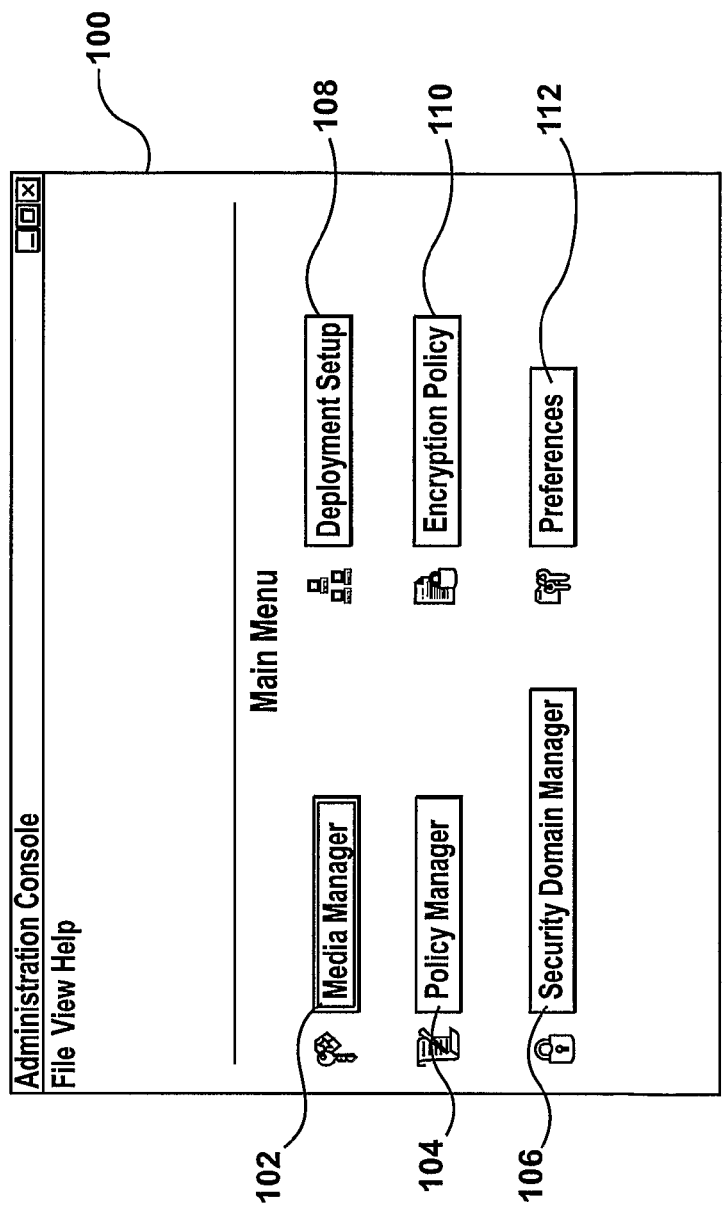
FIG. 5 is a screen shot of a sample administrator options menu.

Reference is now made to FIG. 5, where a screenshot of a sample administrator options menu 100 according to one embodiment is shown. The administrator is able to choose from among the options presented to him/her on the administrator options menu screen 100. In one embodiment, the administrator options menu 100 contains the following options from which an administrator may select, a media manager icon 102, a policy manager icon 104, a security domain manager icon 106, a deployment setup icon 108, an encryption policy icon 110, and a preferences icon 112.

Figure 6:
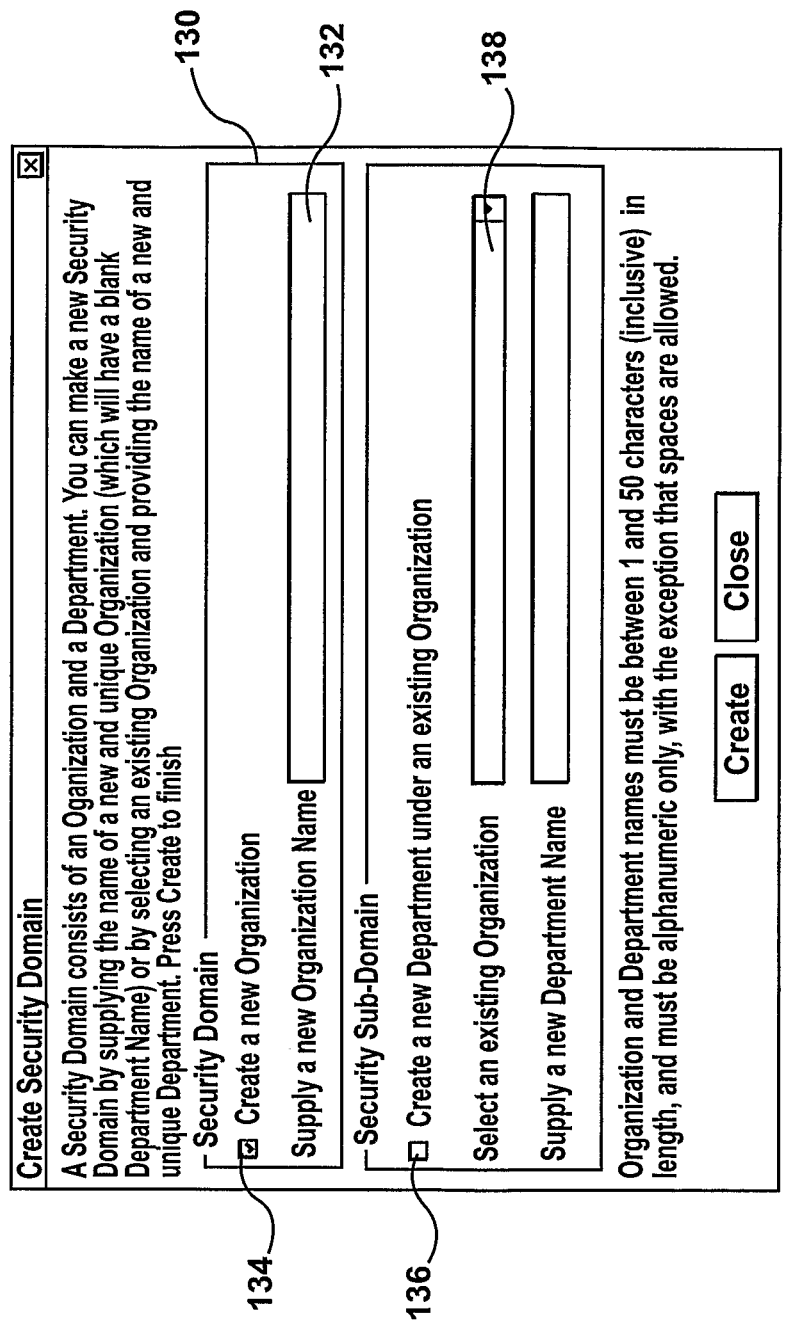
FIG. 6 is a screen shot of a sample security domain menu.

An administrator, in order to set up the cryptographic control system 32 for a particular organization, one security domain is required. In order to set up at least one security domain, the security domain manager icon 106 is selected. Reference is made to FIG. 6, where a security domain screen 130 which is displayed to the user as a result of the selection of the security domain manager icon 106 is shown. The cryptographic control system 32 of the present invention allows various security domains and security sub-domains to be defined for a particular organizational network.

Figure 7:
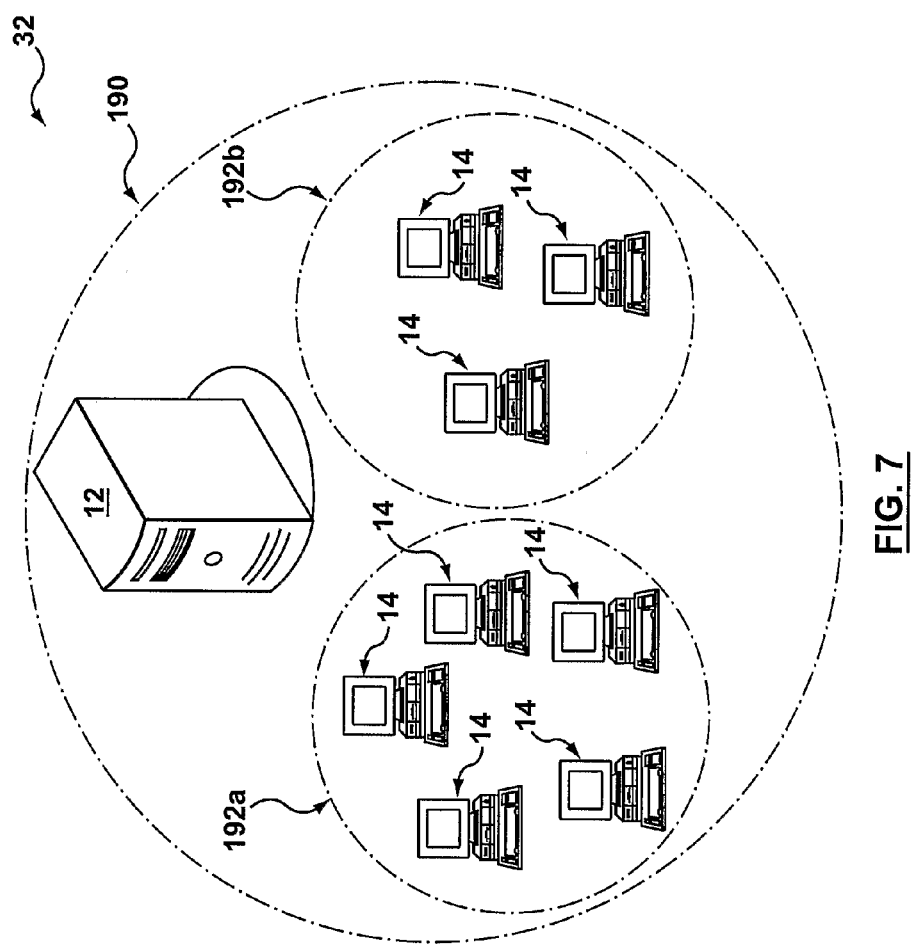
FIG. 7 is a diagram of a network organized in accordance with one security domain and multiple security sub domains.

To further illustrate the security domain and security sub-domain concept, reference is made to FIG. 7, where it is shown that within an organization network 30 all of the computing devices belong to security domain 190. Also, within a security domain 190, there may be one or more optional security sub-domains 192. In FIG. 7, two security sub domains are illustrated, respectively, security sub-domain 192a and security sub domain 192b. Security sub-domains are generally organized so as to include all the computing devices that are associated with a particular department within an organization or based upon some other logical relationship between the various computing devices 14. By having the mobile storage means 18 associated with a security sub-domain 192, the cryptographic control system 32 can ensure that mobile storage means 18 cannot be used to transfer data between computing devices 14 that are not part of the same security sub-domain 192. Such a restriction on transferring data is desirable within an organization when data is regarded as proprietary to a specific department, and it is desired that such data is not accessed by members of other departments. In another embodiment of the invention, It is also possible for there to be more than one security domain 190 associated with an organizational network 30.

Reference is again made to FIG. 6, where the sample security domain menu 130 is shown in one embodiment. The security domain screen 130 illustrates one embodiment for how security domains 190 and security sub domains 192 may be defined. The security domain screen 130 has a security domain field 132, a new security domain flag 134, a new security sub domain flag 136, and a security sub-domain field 138. An administrator is able to create a new security domain 190 by making use of the new security domain flag 134. By selecting the new security domain flag 134, the administrator can then enter the name they desire for the security domain 190 in the security domain field 132. If the administrator desires to add a new security sub domain 192 to an existing security domain 190, the administrator will select one of the security domains 190, the administrator may do so by making use of the security sub domain flag 136 and security sub domain field 138.

The administrator is able to define as many security domains and security sub domains 192 as desired. When the administrator has specified at least one security domain 190, the administrator is now able to specify policies which will be associated with a computing device 14 or user. The term policy is used to represent a set of rules that define the operations that are allowed between mobile storage means 18 and computing devices 14. Policies may be defined by the administrator with respect to one specific user, or for a class of users. In one embodiment, the administrator is able to specify policies that will regulate the operations by means of choosing the policy manager icon 104. Within the cryptographic control system 32 multiple policies may be specified for an organizational network 30.

Figure 8:
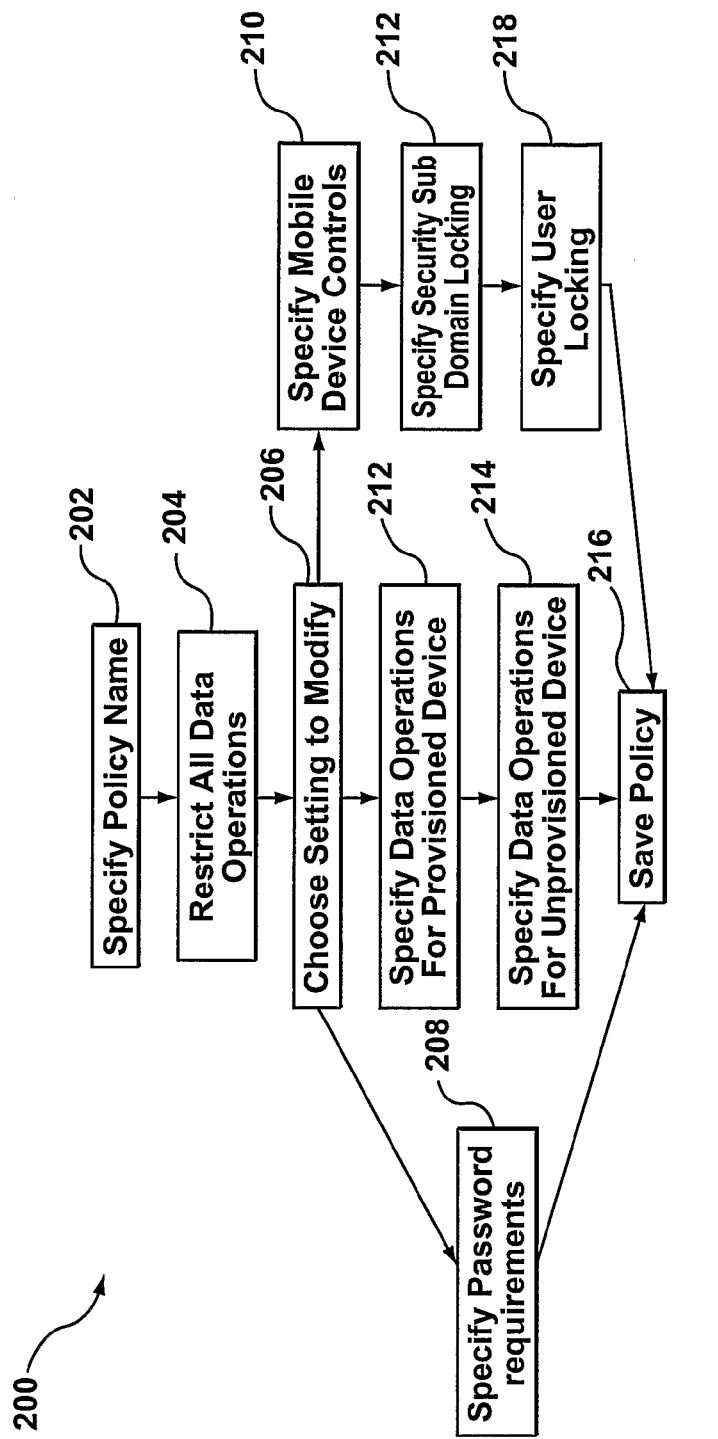
FIG. 8 is a flowchart illustrating the steps of a policy specification method.

Reference is now made to FIG. 8, where the steps of policy specification method 200 in one exemplary embodiment are shown. Policy specification method 200 is employed by the administrator in order to specify the operations which are allowed with respect to provisioned and nonprovisioned devices. The policy specification method 200 is described with reference to FIG. 9, where one embodiment of a policy editor menu 150 that is used by the administrator to carry out the steps of policy specification method 200 is shown. Policy specification method 200 is invoked upon the administrator selecting the policy manager icon 104.

Figure 9:
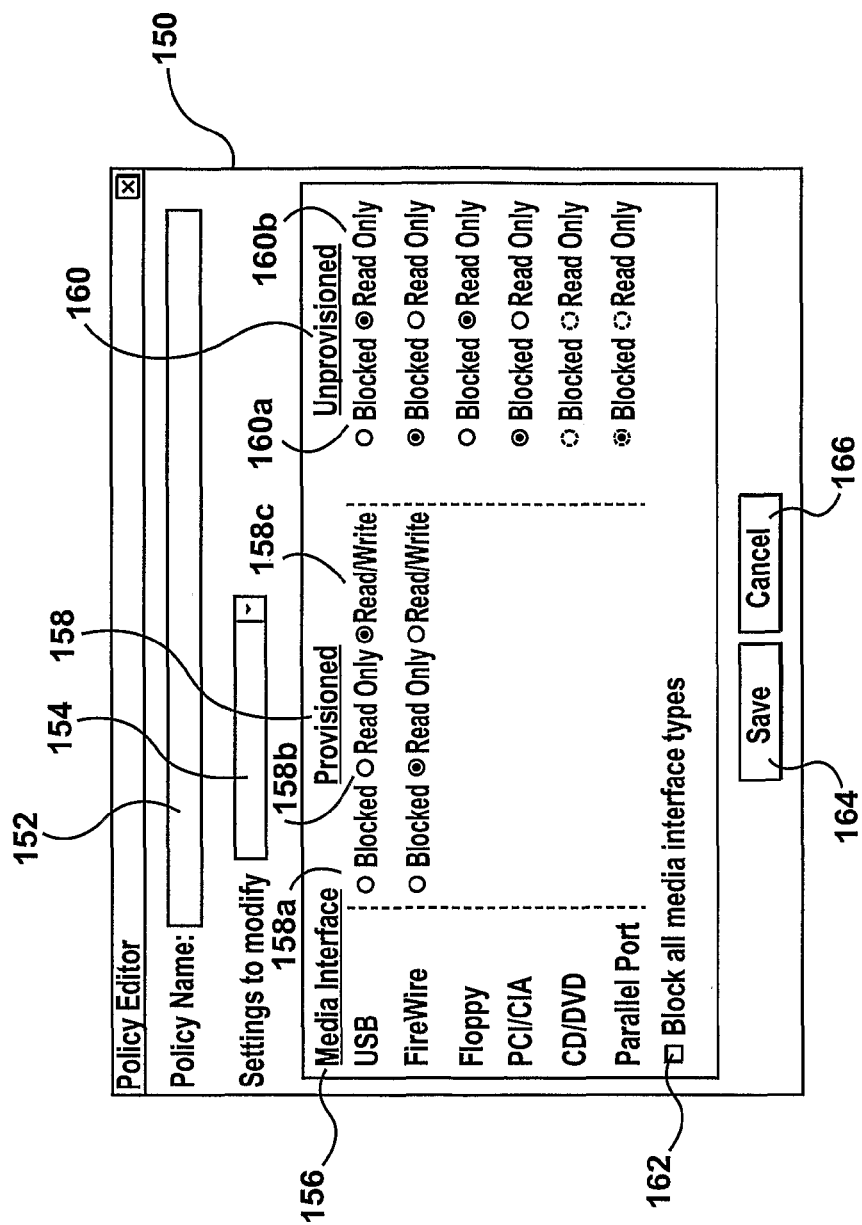
FIG. 9 is a screenshot of a sample policy editor menu.

Reference is now made to FIG. 9, where the policy editor menu 150 is shown. The policy editor menu 150 contains a policy name field 152, a modify settings field 154, a media interface field 156, a provisioning field 158, an nonprovisioned field 160, a restrict access tab 162, a save button 164 and a cancel button 166. The policy editor menu is used by the administrator to define or update policies which define the operations that are permitted between mobile storage means 18 and computing devices 14.

Policy specification method 200 begins at step 202, where the name of the specific policy that is being created or edited is entered into the policy name field 152. The administrator is able to add and delete the various types of computing devices 14 which are to be included as part of the policy specification method. Upon specifying the policy name that is being created or modified, the administrator will have the option in step 204 of restricting all data operations for this policy by making use of the restrict access field 162. If the administrator selects the restrict access field 162, computing devices 14 which are associated with this policy will not be able to interact with any mobile storage means 18.

Policy specification method 200 then proceeds to step 206, whereby the administrator specifies settings that are to be modified by making use of the modify settings field 156. In one embodiment, the user may choose to modify password settings, or mobile device control settings, or locking settings. If the user chooses to modify the password settings, method 200 proceeds to step 208. In step 208, the user is able to specify any password requirements that are associated with the administrator and any other users who may have access to the administrator application. Upon the conclusion of step 208, method 200 may return to step 206 where the administrator may chose to modify other settings.

If in step 206, the user selects the option of specifying mobile device controls, method 200 proceeds to step 210. In step 210, the administrator is able to specify the types of data operations that are allowed between a computing device 14 and provisioned and nonprovisioned mobile storage means 18. In step 210, the administrator is able to chose different operations which may be allowed and/or restricted. Operations represent the various actions that may take place between computing devices 14 and mobile storage means 18. Operations may include but are not limited to a mount operation, a copy operation, a delete operation, a secure delete operation, a read operation, a write operation, a transmit operation, an execute operation, and a block operation.

A mount operation involves interfacing the mobile storage means 18 with the computing device 14 so that data contained on the mobile storage means 18 may be accessed. A copy operation involves the process of making a copy of some data stored on the mobile storage means 18. A delete operation involves deleting data from the mobile storage means 18. The delete operation is to be contrasted with the secure delete operation, as the secure delete operation performs an overwrite of the data that is requested to be deleted, whereas the delete operation removes the name of the file associated with the data from a file directory index, but does not actually delete the data. The read operation involves retrieving data from a mobile storage means 18. The write operation involves the process of having data written to the mobile storage means 18. The transmit operation involves the process of transmitting information across an interface. The execute operation involves the process of reading data certain that is stored upon the mobile storage means 18 that is contained in an executable format.

Method 200 then proceeds to step 212, where in one embodiment, the administrator may chose for each provisioned mobile storage means 18 referenced in the media interface field 156, various data operations that are allowed. Specifically, the administrator may specify that no data operations may be performed between a specific type of provisioned mobile storage means 18, by selecting the block tab 158a. When the block tab 158a has been selected, the policy in place will not allow any data operations between the computing device 14 and a provisioned mobile storage means 18. The administrator instead of choosing to block data operations between the two, may chose to only allow the computing device 14 to read from the provisioned mobile storage means 18, by selecting the read only tab 158b. The administrator may also chose the read/write tab 158 c, which allows for provisioned mobile storage means 18 to be able to ready from and write to computing devices 14 which are associated with a specific policy.

Policy specification method 200 then proceeds to step 214 where the allowable data operations between nonprovisioned mobile storage means 18 and computing devices 14 are specified. In one embodiment, the administrator will choose between two options, and either block all data operations between nonprovisioned mobile storage means 18 and computing devices 14 or to allow read only operations. However, it should be noted that other operations may be defined. The administrator can chose to block the data operations by selecting the block tab 160a. The administrator, in this embodiment has the option of allowing read operations only, wherein the computing device 14 is able to read from the nonprovisioned mobile device 18. The administrator may only allow read operations by means of the read only tab 160b. Upon the administrator having completed the preceding steps of the policy specification method 200, method 200 may proceed to step 216. In step 216, the administrator in order to save the various rules that have been specified in steps 212 and 214 selects the save button 164, and the policy settings will be then saved to a file. Once saved, the policy settings may be retrieved for modification. Upon the conclusion of step 214, the administrator may chose to modify other settings and return to step 206.

Figure 10:
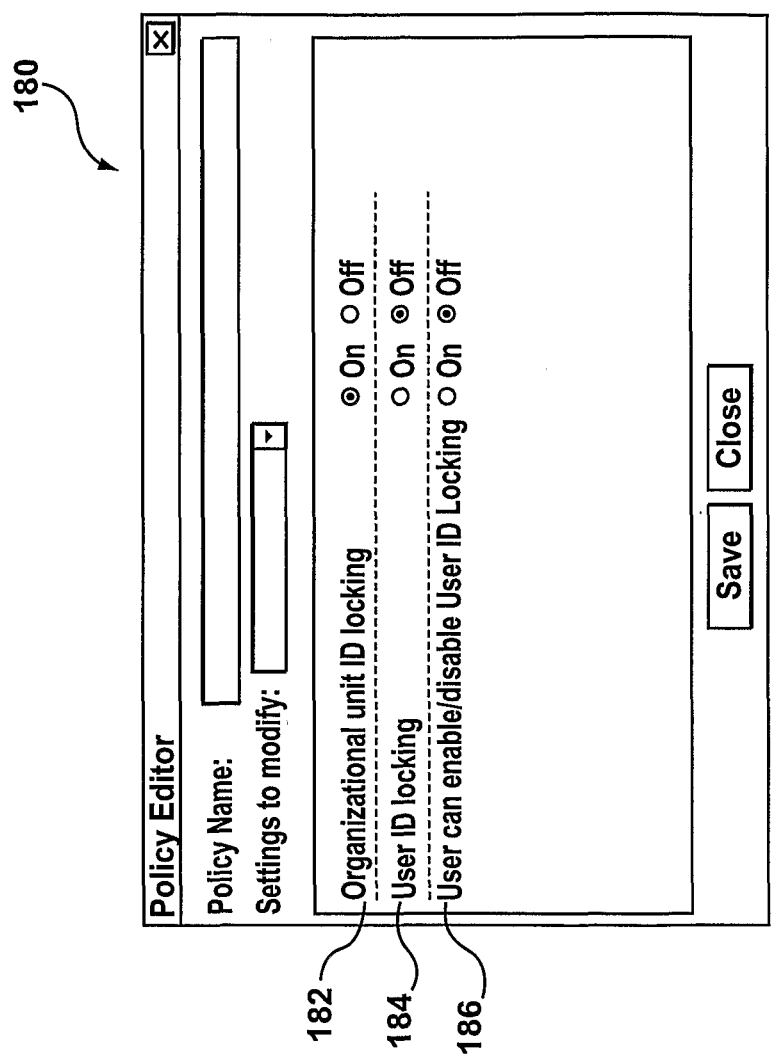
FIG. 10 is a screenshot of a sample policy editor locking menu.

If in step 206, the administrator chooses to modify settings pertaining to locking of the mobile devices 18, method 200 proceeds to step 218. In one embodiment, step 218 relates to blocking of access to mobile storage device 18 based on the security sub domain 192 that may be associated with the provisioned mobile storage means. Reference is made to FIG. 10, where one embodiment of a sample policy editor locking menu 180 is shown. The policy editor locking menu 180 will be displayed to the user when the user opts to proceed to step 218. Policy editor locking menu 180 in one embodiment will contain a security sub domain locking field 182, a user ID locking field 184 and a user ID enablement field 186. By making use of the security sub domain field 182 and selecting the "ON" option, the computing device 14 will not be able to access mobile storage means 18 that are associated with other security sub domains 192. The user ID locking field 184, if activated results in the user name that may be associated with the first mobile storage means 18 that interfaces with the computing device 14 being recorded on the computing device 18. By having the user name recorded on the computing device 18, mobile storage devices 18 that have other user names associated with them, may not be used with that respective computing device 14. The user ID enablement field 186 is used to specify whether the user is able to activate or deactivate the controls provided by the specification made with the user ID locking field 182.

The steps of the policy specification method 200 have been described above with respect to one specific embodiment. As can be seen from FIG. 8 and the sample policy editor menu 150, the steps of the policy specification method 200 may be carried out in various orders and the steps as described for the policy specification method 200 are provided to illustrate one possible order of steps which may be carried out in order to define a policy.

The policy specification method 200 as has been illustrated, may be used to define various policies which differ based on the rules that have been specified. Once at least one policy along with one security domain has been defined, the computing devices 14 that are to be part of the cryptographic control system 32 may have installed upon them the client application 38. The client application 38 will be installed upon the computing devices 14 that are to be part of the cryptographic control system 32.

Figure 11:
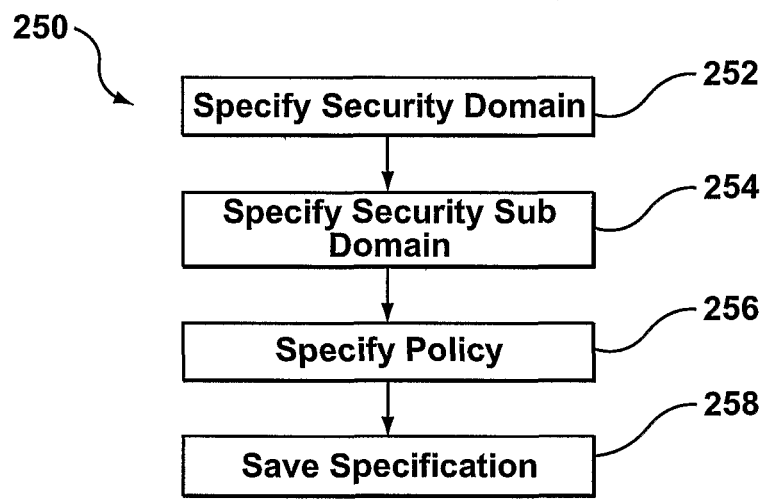
FIG. 11 is a flowchart illustrating the steps of a client application preparation method.

In order to prepare the client application 38 for installation upon a computing device 14, the administrator employs the deployment module 50 that is part of the administrator application 36. The deployment module 50 is invoked in one embodiment when the administrator selects the deployment setup icon 108 from the administrator options menu 100. Reference is now made to FIG. 11, where the steps of a client application preparation method 250 are shown in one embodiment. The client application preparation method 250 allows the administrator to create the client application 38 that is installed upon a specific computing device 14, which has been customized with respect to allowable operations that may take place between the computing device 14 and mobile storage means 18. In one embodiment, the client application 38 has associated with it, a security domain 190, an optional security sub domain 192, and a policy that has been defined through the policy specification method 200.

Figure 12:
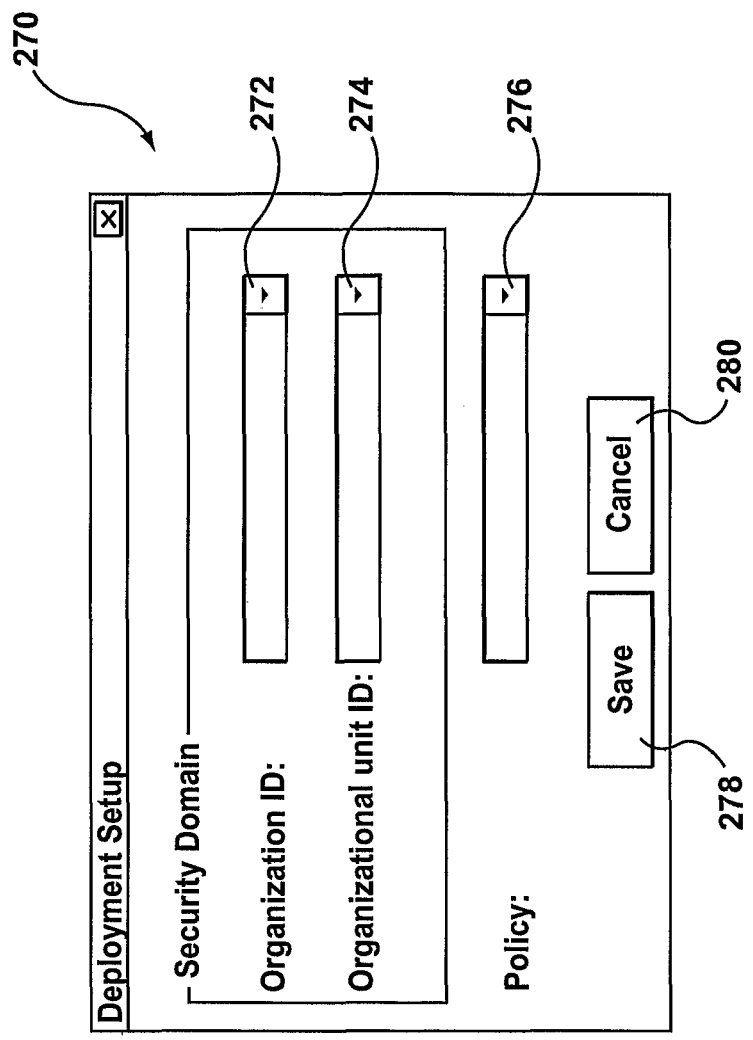
FIG. 12 is a screenshot of a sample deployment menu.

The steps of the client application preparation method 250 are further illustrated with reference to FIG. 12, where a deployment set up menu 270 is shown in one embodiment. The deployment setup menu 270 will be displayed to the administrator upon the deployment setup icon 108 being selected. The deployment setup menu 270 in one embodiment, comprises a security domain field 272, a security sub domain 274, a policy field 276, a save icon 278 and a cancel field 280.

The client application preparation method 250 begins at step 252. In step 252, the specific security domain 190 is specified in security domain field 252. Any security domain 190 that has been created previously may be used. Method 250 then proceeds to step 254 where an optional security domain 192 may be specified in security sub domain field 274.

Method 250 then proceeds to step 256, wherein the policy that is to be associated with the client application 38 is specified in policy field 276. Policies that have been defined through the policy specification method 200 may be specified in step 256.

Method 250 then proceeds to step 258, where the specified settings (security domain 190, security sub domain 192, and policies) are then saved and a deployment file is created.

Within the cryptographic control system 32 various client applications 38 may be specified. As various policies and security domains and security sub domains may be defined, the client application 38 may be tailored for a particular computing device 14 or user of a various computing devices.

At the conclusion of method 250, a client application 38 specific to a particular policy and security domain, and optional security sub domain 192 has been created. The client application 38 may then be installed upon the appropriate computing device 14. The client application 38 is cryptographically protected when installed. Various forms of encryption may be employed to protect the contents of the client application 38. In one embodiment, the contents are encrypted with AES 256 bit encryption. Also, all the contents of the client application are protected with a secure signature HMAC-SHA256 (FIPS 180-2, Secure Hash Standard, NIST). Also, asymmetric public-key based encryption schemes such as RSA or ECC may also be employed.

Once the client application 38 has been installed on the selected computing devices 14, the cryptographic control system 32 is operational. The client application 38 monitors all requests from and to mobile storage means 18. Upon the client application 38 being installed upon the computing devices 14, the cryptographic control system 32 is able to regulate the interaction between provisioned and nonprovisioned mobile storage means 18.

Figure 13:
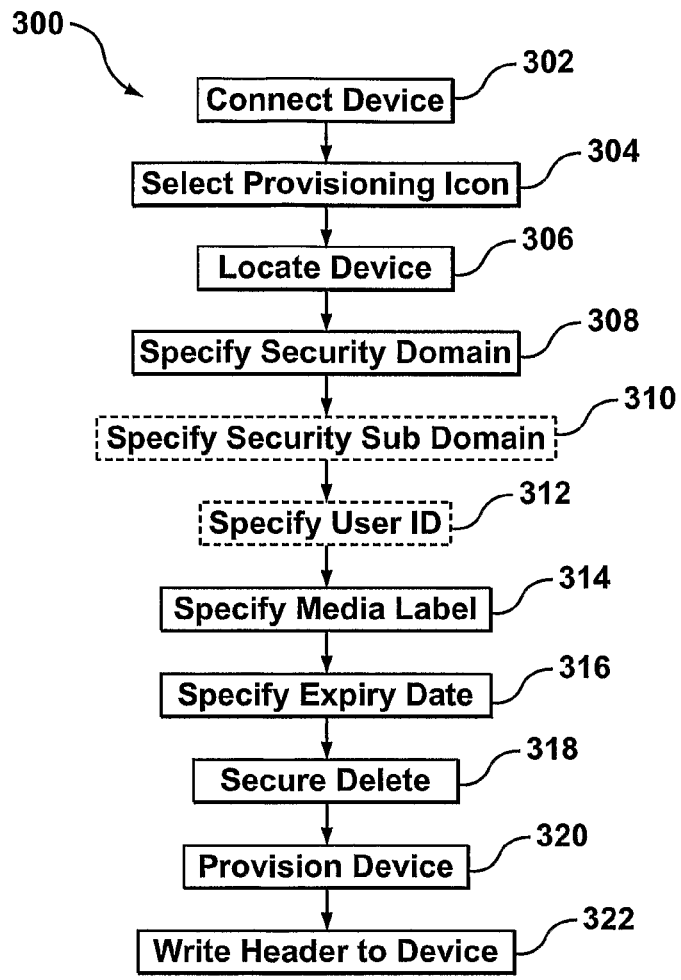
FIG. 13 is a flowchart illustrating the steps of a provisioning method.
Figure 14:
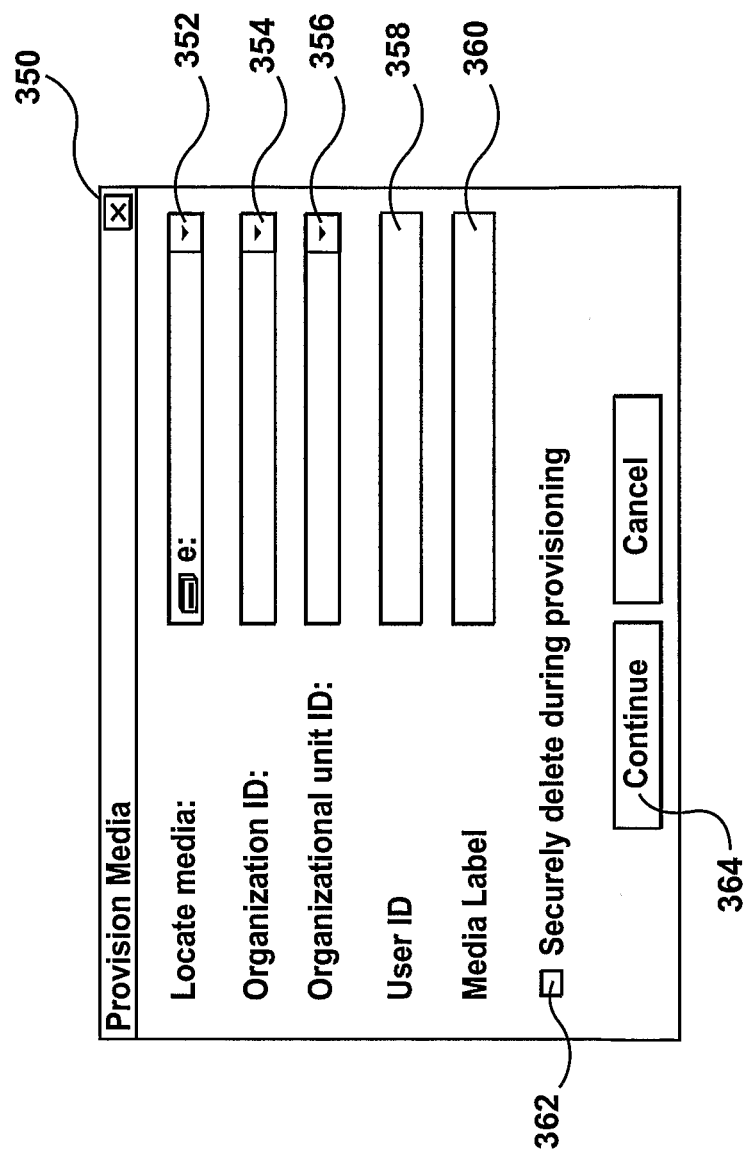
FIG. 14 is a screenshot of a sample media provisioning menu.

The provisioning of mobile storage means 18 will now be described with reference to provisioning method 300. Reference is made to FIG. 13 where the steps of provisioning method 300 are shown in one exemplary embodiment. Provisioning method 300 begins at step 302, where a mobile storage means that is to be provisioned is connected to the computing device upon which the administrator application is running. The mobile storage means 18 is connected to the computing device 14 via the interface 20. Method 300 then proceeds to step 304, where the administrator selects the media manager icon 104 from the administrator menu 100. Upon the selection of the media manager icon 104, a media provisioning menu 350 is displayed to the user. Reference is now made to FIG. 14, where a sample media provisioning menu 350 is shown in one exemplary embodiment. Method 300 then proceeds to step 306, where the drive to which the mobile storage means 18 has been connected, is specified by means of a locate media field 352. The Locate media field 352 displays to the user the drive letters that are associated with the computing device 14. The drive letters that are displayed, will be the same as are associated with Microsoft Menus™ or any other operating system that is being used. The user specifies the drive letter to which the mobile storage means 18 is connected. Method 300 then proceeds to step 308, where the specific security domain 190 that is to be associated with the mobile storage means 18 is specified. The mobile storage means 18 must be associated with a security domain 190. The security domain 190 is specified in the security domain field 354.

Method 300 then proceeds to optional step 310, where a security sub domain 192 may be specified. The security sub domain 192 may be specified in the security sub domain field 356. Method 300 then proceeds to step 314 where a media label is specified, which is used with respect to specifying any meta-data that may be associated with the storage. Step 314 is accomplished by means of entering the media label in media label field 360.

Method 300 then proceeds to optional step 316 where an expiry date may be specified. The expiry date, is a date after which the mobile storage means 18 may not be used. In order to ensure that the user does not attempt to change the date associated with a computing device 14, such that the expiry date is never reached, an external time and date server may be used by the computing device 14 to determine the current date and time. Therefore, no malicious attempts at changing the date associated with the computing device 14 may be successful in such instances.

Method 300 then proceeds to optional step 318 where the administrator may chose to have the contents contained on the mobile storage means deleted. Selecting the secure delete operation in step 318 will result in all the sectors of storage of the mobile storage means 18 being overwritten. This is in contrast to simply deleting the files (if any) that are contained on the mobile storage means 18, wherein this delete operation means that the sectors associated with the deleted content will be overwritten. The option of selecting a secure delete operation is carried out by choosing the secure delete box 362 that is shown in FIG. 14.

Method 300 then proceeds to step 320, where the administrator upon verifying that all the previous steps have specified the correct information specifies that the mobile storage means be provisioned.

Figure 15:
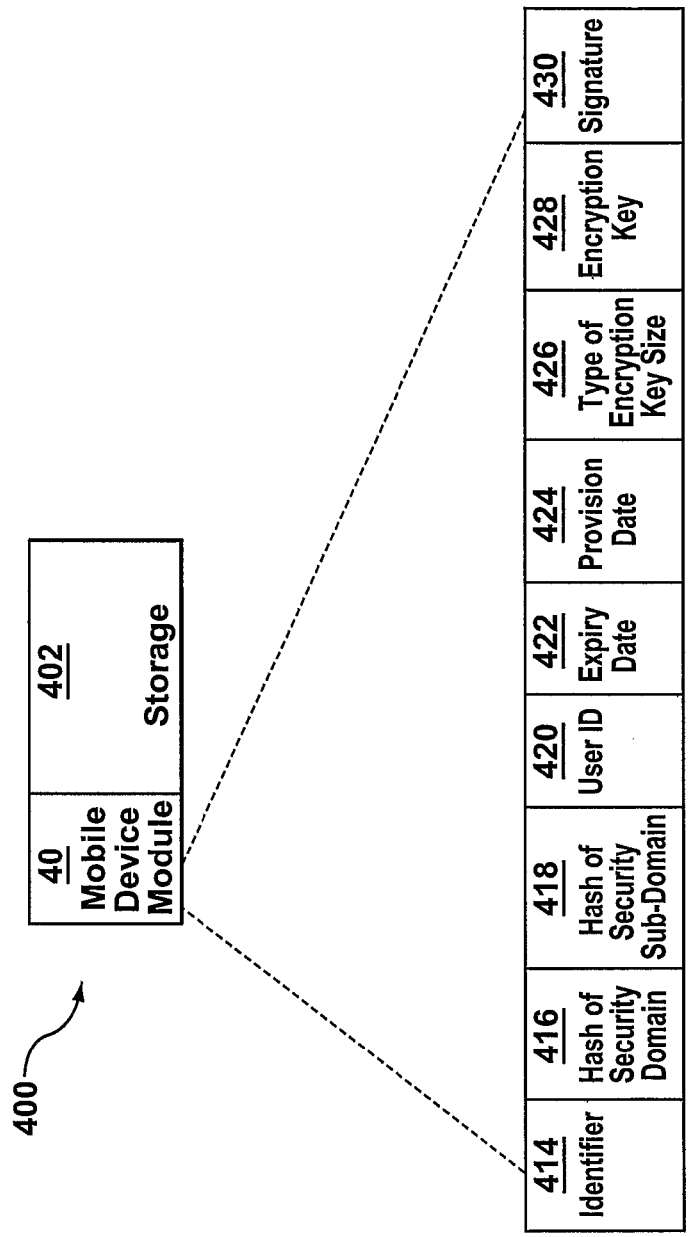
FIG. 15 is block diagram illustrating the contents of the mobile device module.

Method 300 then proceeds to step 322, wherein the mobile storage means 18 is provisioned, by having a header which represents the mobile device module 40 written to an unused sector of the storage located on the mobile storage means 18. Reference is made to FIG. 15, where the storage 400 associated with a mobile storage means 18 is illustrated for purposes of example only. FIG. 15 illustrates an exemplary structure of storage 400 that is located upon a mobile storage means 18. The storage 400 of the mobile storage means 18 may generally be divided up into two areas, a mobile device module 40, and a storage block 402. The mobile device module 40 contains information that controls access to the storage block 402 of the mobile storage means 18. Specifically, the information that is comprised in the mobile device module 40 is based on the options specified in the provisioning method 300.

In one embodiment, the mobile device module 40 includes a unique identifier 414, that is used to recognize the mobile device module 40. The header block also includes in one embodiment, a hash of the security domain 416, and if one has been specified, a hash of the security sub domains 418, user ID 420, expiry date 422, provision date 424, encryption information 426, encryption key 428, and a signature 430. The various attributes associated with the header block may be encrypted, specifically, the encryption key 428 may be encrypted. The hash of the security domain 416 in one embodiment is a SHA256 hash of the security domain 190 that has been specified as part of the provisioning method 300. The hash of the security sub domain 418 in one embodiment is a SHA256 hash of the security sub domain 192, if one has been specified as part of the provisioning method 300. The encrypted information 426 represents the type of encryption that is to be employed (whether for example, it is AES, or DES) along with the strength of the encryption that is to be used (for example, 128 bit, or 256 bit). The encryption key 428 is the key that is used to encrypt all data that will be written to the mobile storage means 18 as is explained in further detail below. In one embodiment, the encryption key 428 when first written to the mobile device 18 is encrypted with a default password. When the mobile storage means 18 that has been provisioned is then used to interface with a computing device 14 that is part of the cryptographic control system 32, the user will be requested to enter their own password and change the default password that has been specified. That password is then used to encrypt the encryption key 428. The signature field 432 contains in one embodiment, a HMAC-SHA256 signature that is used by the cryptographic control system 32 to determine whether the contents of the mobile device module 40 may have been altered.

As a result of the storage of the encryption key 428 upon the mobile storage device, any data that is written to the mobile storage device 18 (if the rules determine that such an operation is allowed) will be encrypted by the encryption key 428. If a user attempts to use a computing device 14 that is not part of the cryptographic control system 32 to access a provisioned mobile storage device 18, the computing device 14 will be unable to access the data as it is encrypted, and the appropriate decryption can not be performed.

Reference is now made to FIG. 16, where a sample user login menu 450 is shown. When an attempt is made to interface a provisioned mobile storage device 18 with a computing device 14 that has installed upon it the client application 38, the user will be presented with a log in screen. The log in screen, in one embodiment may be user login menu 450. The user login menu 450 is what is displayed to the user the first time they attempt to use a provisioned mobile device 18 with a computing device 14 that is part of the cryptographic control system 32. The user will be required to specify a new password in the user login menu 450. The new password will be used to encrypt the encryption key 428.

Figure 17:
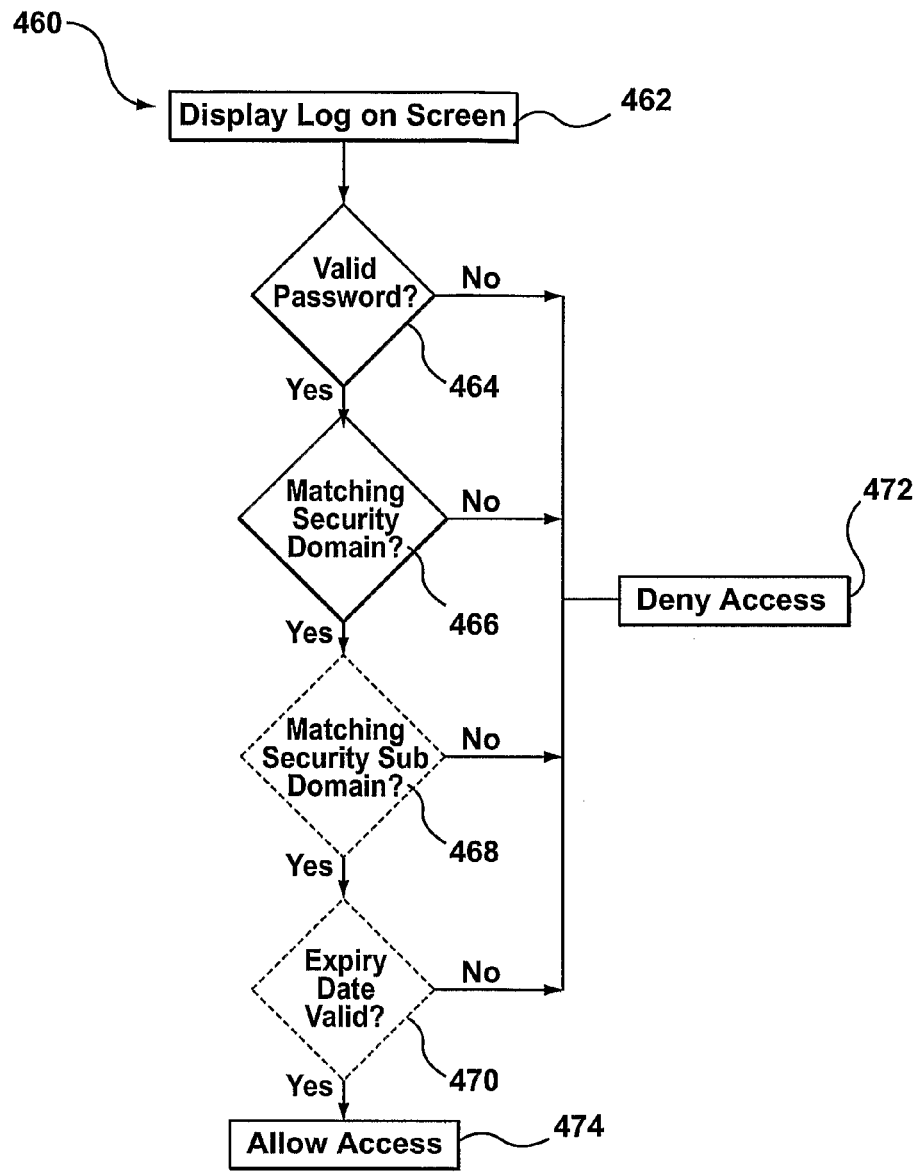
FIG. 17 is a flowchart illustrating the steps of an access control method.

With subsequent attempts to interface a provisioned mobile storage device 18 with the computing device 14 that is part of the cryptographic control system are made, an access control method 460 is employed by the client application 38 in order to determine whether any operations are allowed between the mobile storage device 18 and the computing device 14. Reference is made to FIG. 17 where the steps of access control method 460 are shown in one embodiment.

Access control method 460 is initiated upon a provisioned mobile storage device 18 being connected to computing device 14 upon which the client application 38 has been installed. Method 460 begins in step 462, where the user will be prompted to enter the password that is associated with the mobile storage device 18. Method 460 then proceeds to step 464 and determines whether the password that was entered by the user in step 462 is valid. The password in this embodiment, is not stored permanently, it will serve as a key derivation function which is then used to determine the validity of the password that was entered. If it has been determined in step 464 that the user has entered a valid password method 460 proceeds to step 466. In step 466 the hash of the security domain 416 is compared to a hash of the security domain that is maintained by the client application 38. If there is a match, then method 460 proceeds to step 468, where if a security sub domain 192 has been specified, the hash of the security sub-domain 418 is compared to a hash of the security sub-domain that is maintained by the client application 38. If there is a match, then method 460 proceeds to step 470, where the expiry date (if one has been provided) that is associated with the provisioned mobile storage device 18, and is part of the mobile device module 40, is checked to see if the date is valid. If either of steps 464, 466, 468, or 470 do not produce affirmative results, method 460 will proceed to step 472, where access to the computing device 14 will be denied to the specific mobile storage means 18. If steps 464, 466, 468 and 470 all produce affirmative results, then method 460 proceeds to step 474, wherein access will be granted to the mobile storage device 18 such that any other attempted organizations will be evaluated based on the rules that have been included in the appropriate policies.

Figure 18:
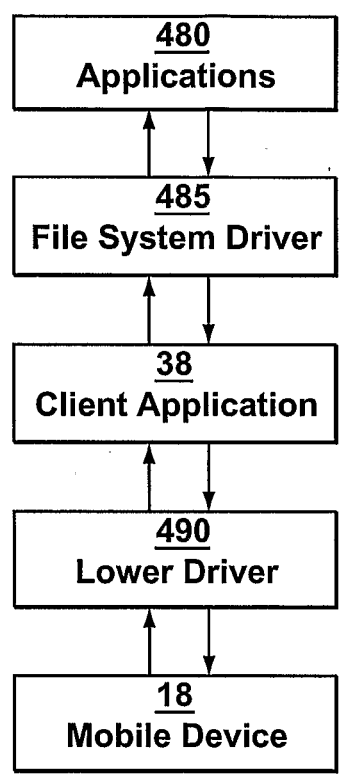
FIG. 18 is a block diagram illustrating the interaction between the client application and components associated with the computing device.

Reference is now made to FIG. 18, where a block diagram illustrating the interaction between the components of the computing device 14 and the mobile storage means 18 are shown. For a computing device 14, that is part of the cryptographic control system 32, in that it has installed upon the client application 38, the monitoring module 64 of the client application 38 monitors all interfaces associated with the computing device 14 to determine whether any operational requests have been made to a mobile storage means 18 or from a mobile storage means 18. In FIG. 17, applications 480 may represent any application that is resident upon the computing device 14 or connected to the computing device 14 that may require data from a mobile storage means 18. Examples of such applications are provided for purposes of example, and may include word processing applications, web browsers, and database programs. The file system driver 485 is part of the operating system that is installed upon the computing device 14, and is used to respond to data requests from applications. In conventional systems, the file system driver 485 would receive the request from the application 480 for data to be retrieved from a specific location and send that request to a lower driver 490. The lower driver 490 is an operating system driver that will first receive the data from the mobile device 18. The lower driver 490 may be comprised of more than one driver, for example a volume class driver, a disk class driver and a port driver may all be part of the lower driver 490. In the cryptographic control system 32, the client application 38 will receive all requests between the file system driver 485 and the lower driver 490. The client application 38 will enforce the appropriate policy that has been defined and will only allow those operations which the policy will support.

Figure 19:
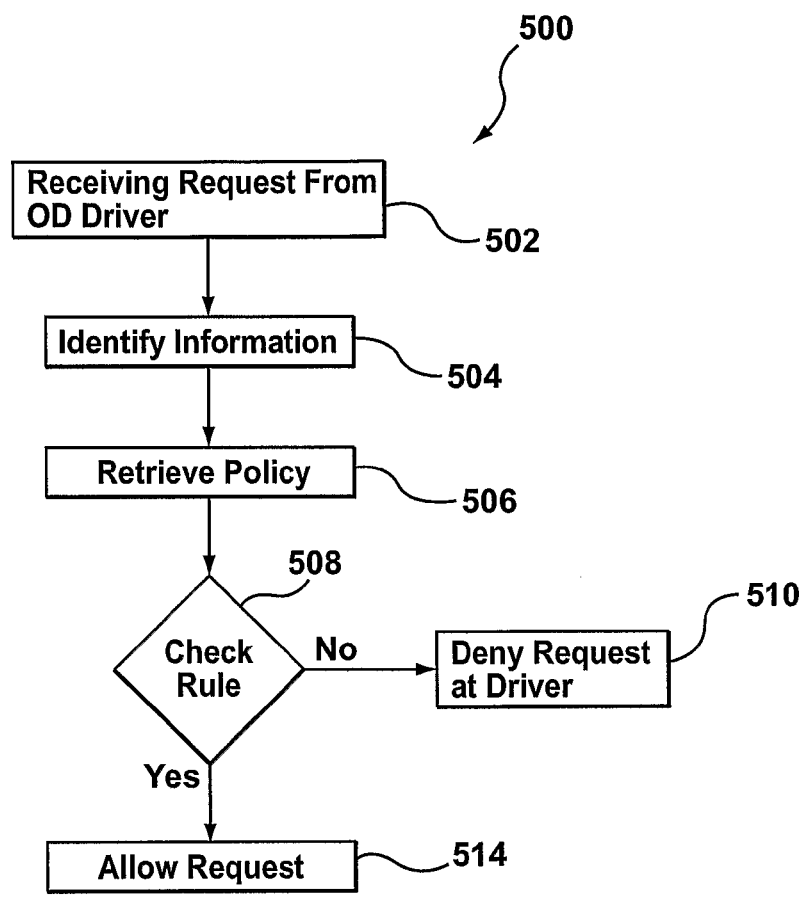
FIG. 19 is a flowchart illustrating the steps of a device access method.

Reference is made to FIG. 19 where the steps of a device access method 500 are shown. Device access method 500 is carried out by the client application 38 and is used to determine whether the computing device 18 may interact with a mobile storage means 18.

Method 500 begins at step 502 where the client application 38 receives a request for data from the file system driver 480. Method 500 may receive a request for data from any driver that is associated with the operating system and the file system driver 480 is being used as an example with respect to an embodiment of the invention. Method 500 then proceeds to step 504 where information pertaining to the request is identified. Information pertaining to the request may include information pertaining to the source of the request and the device to which the request is being addressed, along with information pertaining to the specific device 18 such as whether it is a provisioned or nonprovisioned device 18.

Method 500 then proceeds to step 506 where the policy that is associated with the client application 38 is retrieved. The policy has been defined by the administrator as has been described above and will comprise the set of rules that are associated with the respective computing device. Method 500 then proceeds to step 508 it is determined whether the request is allowable by analyzing the rules that have been defined by the administrator taking into account the information that has been retrieved in step 504. If it is determined in step 508 that the request is allowable, method 500 proceeds to step 512, where the request is allowed. If it is determined in step 508, that the rules would not allow the request, then method 500 proceeds to step 510 where the request is denied, and the lower driver 480 is informed that the request is denied.

The keys that are used in the encryption of data as has been described, are derived using a key derivation hierarchy, employed in a key management system. A key that will be referred to as the root key will be associated with a cryptographic control system 10. The root key, which may be a symmetric or asymmetric key, is made use of by the cryptographic control system 10, to derive keys that will be used in encryption (such as for example, the encryption key 366 that is part of the mobile storage module).

A description of the key management system, is provided in the following section, titled "Key Management".

In one exemplary embodiment, to ensure that updates that have been made to the provisioning information or a temporary policy bypass are authorized, a special dynamically generated code may also be employed. The code may be generated from what is referred to as seed data using a known algorithm that ensures that the next value of the code is very difficult to predict even having known the previous ones. A pseudo-random number generator is a good example of such an algorithm. The seed data is not intrinsic to the computing station and should be random. The code, generated based on the seed information and some external conditions, such as a passed time, a network location, or others, acts similar to a dynamic digital signature. The code or dynamic signature would change based on a change in both the seed data and that external condition. It provides an authorization mechanism for a computing device. If the seed has been delivered securely to the computing device beforehand, and the external condition is known, than the code which is supplied along with the policy change can be verified by the computing device before it acts on that change Key Management The key management system uses secure keys to perform authentication, integrity checks, encryption/decryption, and therefore, key management is a very important component that is responsible for overall security throughout its life cycle.

The key management protocol supports: 1) strong encryption; 2) adequate throughput; 3) key recovery; 4) one-step electronic date shredding; 5) good keys unpredictability; and 6) policy-driven data access.

Key management (KM) uses a hierarchical key model: with one Master Key (MK) at the top, and a tree of dependant keys underneath. Each key on level N depends on its parent from level N−1 as well as on a seed message generated by N-level security officer and, possibly, other N-level secret-holders (level 0 being the highest, level 1 is next, and so on). A key from level N, in turn, must be used to derive its N+1 level child key. Each key, except MK, has exactly one parent, but can have many child keys associated with it. Association means that applying its parent key on a seed message, ticket (see below) and a special Key Derivation Function (KDF) can derive a child key.

Each key, except MK, has both vertical and horizontal dependencies (see formula below). As a KDF, KMS uses Password Based Key Derivation Function—PBKDF (for example, PBKDF2, described in PKCS#5 v2 standard). PBKDF gives good keys entropy (feature 5). As a seed for PBKDF, KMS supports either Shamir key-splitting scheme to generate a seed out of M private passwords; any K of them can be used to reproduce the seed (values for M and K (K<=M−1) will be configurable), or a straight password. This will address feature 6. KMS protocol addresses (1) by utilizing symmetric Advanced Encryption Standard—AES (for example, by using AES-256). AES encryption is both very strong and allows significant throughput, which can be achieved even by software only (features 1,2). Keys are stored on a media wrapped with user login and password using PBKDF. This will facilitate key distribution.

To facilitate an easy one-step crypto shredding, every level of keys, except MK, has a shared Ticket—half SHA size byte message, that is used together with a seed (unique for each key) to derive keys at that level. By destroying a ticket for some level, all keys are effectively not recoverable from that level (including) downwards.

The ticket for each level is stored in either HSM and is accessible via UserID and password, or stored locally and can be wrapped using, for example, PKCS#5 protocol. Whenever a key at some level N+1 has to be restored, Secret Holders have to supply their secrets, and the associated Ticket has to be obtained as well. There will be a process enabled by a special application that obtain the ticket for the level just once, and then all the keys can be created/restored for that level.

The following provides an example of the key derivation functions that are employed in the key management system.

PrK, PubK be Private and Public Keys of MKP;
P1, P2, . . . be passwords from password-holders to generate a seed (shared secret in Shamir's terminology) for MK;
SHAMIR—Shamir's key-splitting procedure;
SHA—Secure Hash function (for example—SHA2 that produces 32 bytes of a fingerprint);
PBKDF—Password Based Key Derivation Function;
AESn—AES key from level N.
Then the key derivation process is as follow:
MK derivation:
PBKDF(PrK(SHA(SHAMIR(P1, P2, . . . , PM))))=$AES_0$
And MK fingerprint (MKF) is calculated as:
PubK (SHA(SHAMIR(P1,P2, . . . PM)))=MKF.
MKF is public knowledge that is used to verify that MK is restored correctly.
To verify MKF:
1) HSM uses PrK to decrypt MKF to get SHA(SHAMIR (P1,P2, . . . ));
2) SHAMIR function is applied to get a seed: SHAMIR (P1,P2, . . . )
3) SHA is calculated on a seed;
4) The result of step 3 is compared with 1)
Both formulas must be implemented in HSM with the only inputs being P1, . . . , PK.

Key derivation for level N+1 is accomplished through the following formula:

$$PBKDF(AES_n(<\text{first half of } SHA(seed|T)>))=AES_{n+1}$$

Where T is Ticket for N level, operation "|" means concatenation of byte streams.

The seed can be either a secret chosen by a Security Officer responsible for the data which is going to be protected under the key $AES_{n+1}$, or a shared secret generated by SHAMIR procedure on inputs from N+1 level Secret Holders. Key Management System will give a choice.

Each root key starts a key hierarchy and, thus, defines a security domain—set of objects protected by keys derived from the root directly or indirectly. Objects from a different domain cannot be decrypted and, therefore, are inaccessible. Domains represent cryptographic boundaries, which are important to have to comply with many security regulations. By applying the same cryptographic mechanism, any number of security subdomains can be created. For example, if some tickets have the same subset of bytes they effectively fall into the same subdomain. By denying knowledge of that shared ticket information, objects became inaccessible. Any application that performs cryptographic operations on keys can, therefore, impose access policies based on both domain and subdomain restrictions. By applying long enough tickets, any desired number of levels can be achieved. To facilitate domain/subdomain restriction, Domain/Subdomain ID can be generated (for example, in the form of big unique integers) at the same time as keys are generated.

Every N-level key, except for MK, has to have a policy file stored locally on a media together with a wrapped key (see Distributing keys section about key wrapping). Key policy file can be encoded as a X.509 v3 certificate or a binary file.

The policy file contains all or some of the following fields: policy creation date; key expiration date; access level (either admin, or external user); security domain ID in an encrypted form or as it's SHA; security subdomain ID in an encrypted form or as it's SHA; check schedule (time interval to check policy); user login name associated with the key (several users can be associated with the same key, but only one key is associated with a user); volume the key is associated with; admin login name; activated status; key's hash (driver's ID); signature (based on HMAC-SHA, for example).

If a Key Policy file is encoded as a binary file, the layouts of the unencrypted fields may be as follow. The encoding might use ASN.1 approach: every field has one byte tag, one byte length, and value bytes: {tag, length_byte, value_bytes . . . }.

The whole policy is encrypted with a wrapping key using, for example, PKCS#5 protocol. The wrapping key is created using a special wrapping password which is not stored anywhere and is applied every time both the key and the policy file get distributed. Before wrapping, policy file gets re-signed with a wrapping password.

Therefore, wrapping requires both passwords—one that has been used for creating a key, and a wrapping password. This provides the authentication for the wrapping process. However, unwrapping both the key and the policy file, and checking policy's signature required just the wrapping password.

Key recovery is an ability to reconstruct an encryption key without having known a password for a wrapping key. It's a very important feature that allows data to be recovered in a case of a password loss. On the other hand, key recovery cannot be done by an end user, thus providing strong cryptographic protection to data. Only authorized Secret Holders can recover any key, except MK, with a help of a special application.

The key recovery feature is built into the key scheme: having Ticket for the required level and enough Secret Holders to recreate a seed by applying Shamir's threshold scheme and applying key derivation formula, any key, except MK, can be recovered, and a special application for it. This application will first verify Secret Holder credentials by either verifying their Certificates, or Personal profile files.

Any key is destroyed by either key erasing or by zeroizing an HSM holding the key. Also, destroying some secret holdings secrets ensures that Secret Holders cannot recover that key even if they obtain Ticket. The number of destroyed secrets has to exceed the threshold. By destroying a key, encrypted with it data becomes unusable.

Electronic shredding refers to irrecoverable key destruction, so any data that has been encrypted by that key is, effectively, useless and is an "electronic garbage". To electronically shred the whole level, Ticket for that level is destroyed first, and then enough secrets to disable Shamir's threshold scheme have to be destroyed together with a physical key for a specific node. To facilitate massive electronic shredding, a special hierarchy is required (see next section).

There are several suggestions on a key hierarchy that will facilitate key management and electronic shredding. For example, if some data is going to be archived offsite, it should be encrypted by a key/keys that represent a subtree from a well known node. Then destroying the key for that node will effectively shred the data. Alternatively, If some data within an archived volume has different lifecycle (different life horizon or validity time), data of the same validity time should be encrypted by a separate subtree of key/keys. Each node in key hierarchy should start a new subtree of keys using to encrypt data with not-interleaved validity time. Data that has no expiration date may be encrypted by the first level keys. Generally, the deeper the key hierarchy goes, the more short-lived data is.

Symmetric encryption requires input data length to be divisible by, for example, either 8 (for DES/DES3) or $16/32$ bytes (for AES-$128/256$), therefore, if the data has incompatible length, some extra data has to be added before encryption, and stripped down before presenting the decrypted data. This process is called padding. There's no standard padding scheme yet, but one scheme is so widely used, that it has become "de-facto" a standard. This scheme is described together with RSA keys encoding in PKCS#1 standard from RSA Securities.

The scheme works as follows, where before encryption, the input data is always padded. This means that even if data's length is divisible by 16 in a case of AES, additional 16 bytes are added. More precise, number of bytes added—N—can be calculated by the following equation: $N=16-(L \% 16)$, where L is input data's length in bytes; %—is a remainder for L over 16. N is in the range [1-16]. By adding N bytes, L+N become divisible by 16. Each added byte contains the same value, which is equal to N. The padded data is then encrypted.

Before presenting decrypted data after decryption, the padding part has to be stripped down. The algorithm may be described as: 1) get the value of the last byte—N; 2) check that at least N last bytes all have value N; 3) "delete" last N bytes and update data length by subtracting N ("deleting" can be done by just updating the length).

This padding scheme has been used for quite some time and if we need interoperability in terms that other crypto providers have to process our data, they understand PKCS#1 padding.

To support the key management system, the following support is required: 1) hash functions—SHA1 or SHA2; 2) AES-256 in ECB/CBC mode (AES-256/ECB mode is going to be combined with the TWEAK to prevent from "cut & paste" attack); 3) TWEAK implementation; 4) PBKDF2 key derivation function described in PKCS#5 v2; 5) PKCS#1 padding according to PKCS#1 standard; 6) HMAC-SHA signing/verification; and 7) Diffie-Hellman key sharing support.

There can be a need for PKI and RSA support if Key Management System has to be integrated with customer's PKI infrastructure or support certificates to distribute user's keys and policies.

The PKI key management system requires: 1) ASN.1 parser; 2) support to PKCS 1, 5, 8, 9, 10 and probably PKCS11 and PKCS12; 3) support for standard X.509 certificate extensions and attributes; 4) support to X.509 v3 certificates with possible customer specific attributes and extensions and world wide names; 5) possible support for Diffie-Hellman key exchange (PKCS#3), TripleDES in CBC mode, and PKCS#11 to work seamlessly with third-party crypto providers.

There can be a need for a common crypto interface (crypto abstraction layer—CAL) shared by all components that need any type of crypto support. This layer has to allow easy plugging in of different crypto providers, like third-party crypto libraries that can be already in use by our perspective customers, so they trust them and want to keep using them. CAL will be able to support multiple hardware crypto providers and crypto accelerators together with third-party crypto libraries. CAL will allow registering different crypto providers (either software or hardware) for different tasks (like one—for AES, another—for SHA1 and HMAC-SHA1).

Every security system has at least one very important security key, called the Root Key (RK) or Master Key that is used to protect the most important data—usually other keys or root certificates. Protecting this key itself is a challenge. There are three basic approaches to protect the MK: 1) secure physical location with all protection available; 2) storing the MK on FIPS-140.1 level 2 and up Secure Hardware Modules; and 3) Shamir's key splitting scheme.

Protecting the MK is just one side of the problem; another side is to have the MK easily available when needed. Having just one MK introduces another problem—what to do if the key is lost? Making additional copies is usual approach to facilitate this problem, which, in turn, introduces additional security risks and increase complexity of key revocation. First two approaches can, theoretically, achieve high storage security for MK, but lack both easy availability and simple revocation procedure. Shamir's key splitting scheme (SKS) was introduced to effectively address the last two problems.

The idea of SKS is to split a shared secret (S)—an arbitrary bit string, which can be a key, a password, . . . , into N parts with respect to K<N, in such a way, that having less than K parts cannot help restoring S, but having any K and more parts allow unambiguous restoring of S.

The SKS scheme has many mathematical implementation, but the simplest, proposed by Shamir himself, is a concept, called a threshold secret sharing, which is described below.

A probabilistic algorithm PA defines a threshold secret sharing. It takes as input a secret S from some finite set Fs, and it outputs n shares, i.e. bit strings S1, . . . , Sn. Finally, the secret sharing scheme comes with a threshold K, $0 < K < N$. The algorithm must comply with Privacy and Correctness requirements, outlined below. With respect to privacy: Take any subset I of indices $\{1, 2, \ldots n\}$ of size at most $K-1$, and run the algorithm, on any input S', then the probability distribution of $\{Si | i \in I\}$ is independent of S'. With respect to correctness: Take any subset J of the indices $\{1, 2 \ldots N\}$ of size at least K, and the algorithm computes S from $\{Si | i \in J\}$, and, in fact, there is an efficient algorithm that computes S from $\{Si | i \in J\}$.

As an example, assume we set $S=Z_p$ for some prime P, where P>N, and K is threshold we want. Then we can describe the algorithm proposed by Shamir:

1) Choose elements $a_1, a_2, \ldots, a_n \in Z_p$ at random, and let f(x) be the polynomial
   $f(x) = S + a_1*x + a_2*(x**_2) + \ldots + a_k*(x**_k)$. In other words: choose a random polynomial over Zp of degree K at most, such as f(0)=S.
2) Let the shares be defined by $s_i = f(i) \mod P$ for I=1, . . . , N.

The scheme has the properties outlined above, simply because of classical results on Lagrange interpolation. For agrange interpolation: For any field F, and any set of pairs $\{(x_i, y_i) | 0 < i < K+1\} \in F \times F$ where $x_i$ are distinct, there exists exactly one polynomial g(x) over F of degree at most K, such that $g(x_i) = y_i$ for $i = 1 \ldots K+1$. All coefficients of this polynomial can be effectively computed. For the proof, note that polynomial $$g_i(x) = \frac{(x_1 - x)(x_2 - x) \ldots (x_{i-1} - x)(x_{i+1} - x) \ldots (x_{k+1} - x)}{(x_1 - x_i)(x_2 - x_i) \ldots (x_{i-1} - x_i)(x_{i+1} - x_i) \ldots (x_{k+1} - x_i)}$$

satisfies $g(x_i)=1$, $g(x_j)=0$ for $j \neq I$, and has degree at most K. It follows that $$g(x) = y_1 g_1(x) + \ldots + y_{k+1} g_{k+1}(x)$$

has the right properties. It follows directly by construction that g can be efficiently computed. There can be only one solution, since if two different polynomials g(x), g'(x) were both solutions, then g(x)−g'(x) would be a non-zero polynomial of degree at most K with K+1 roots, which cannot exist.

The invention has been described with regard to one embodiment. However, it will be understood by persons skilled in the art that other variants and modifications may be made without departing from the scope of the invention.

The invention claimed is:

1. A computer implemented method of regulating the interaction between a computing station and a mobile storage means, the method comprising:
   a) coupling the mobile storage means to an interface of the computing station, the mobile storage means having stored thereon an encrypted encryption key, the encryption key being encrypted by a password,
   b) identifying an operational request made by the mobile storage means;
   c) accepting an input at the computing station;
   d) determining whether to grant the operational request by:
      (i) determining whether the input comprises the password;
      (ii) granting the operational request if the input matches the password; and
      (iii) denying the operational request if the input does not match the password; and
   e) if the operational request is granted, performing a requested operation by
      (i) decrypting the encrypted encryption key with the password;
      (ii) performing an encryption operation on data using the encryption key; and
      (iii) transferring the data between the computing station and the mobile storage means;
   wherein e(i) through e(iii) are performed in a transparent manner with respect to an operating system of the computing station.

2. The method of claim 1, wherein the computing station comprises a memory having a policy stored thereon, the policy defining permitted operational requests, the method further comprising:
   determining whether the operational request is permitted by the policy; and
   denying the operational request if the operational request is not permitted by the policy.

3. The method of claim 1, wherein the operational request comprises a write operation and granting the operational request comprises encrypting data with the encryption key and storing the encrypted data on the mobile storage means.

4. The method of claim 1, wherein the operational request comprises a read operation and granting the operational request comprises decrypting data stored on the mobile storage means.

5. The method of claim 1, wherein the operational request is selected from the group consisting of: mount operations, copy operations, delete operations, secure delete operations, read operations, write operations, transmit operations, and execute operations.

6. The method of claim 1, wherein the computing station is associated with a first security domain defining a first set of objects that are protected by a first cryptographic key; and wherein the computing station comprises a memory having stored thereon a first identifier identifying the first security domain, and further wherein the mobile storage means is associated with a second security domain defining a second set of objects that are protected by a second cryptographic key; and further wherein the mobile storage means stores a second identifier identifying the second security domain; the method further comprising:

comparing the first and second identifiers; and denying the operational request if the first and second identifiers do not identify a same security domain.

7. The method of claim 6, wherein the first identifier comprises a hash of the first security domain and the second identifier comprises a hash of the second security domain.

8. A system for regulating data flow, the system comprising:

a mobile storage means, the mobile storage means having stored thereon an encrypted encryption key, the encryption key being encrypted by a password; and a computing station configured to:
  couple to the mobile storage means;
  identify an operational request from the mobile storage means;
  accept input from a user;
  determine whether to grant the operational request by determining whether the input comprises the password; and
    denying the operational request if the input does not comprise the password;
  if the operational request is granted, performing a requested operation by
    (i) decrypting the encrypted encryption key with the password;
    (ii) performing an encryption operation on data using the encryption key; and
    (iii) transferring the data between the computing station and the mobile storage means;

wherein (i) through (iii) are performed in a transparent manner with respect to an operating system of the computing station.

9. The system of claim 8, wherein the computing station further comprises a memory having a policy stored thereon, the policy defining permitted operational requests, and wherein the computing station is further configured to:
  determine whether the operational request is permitted by the policy; and
  deny the operational request if the operational request is not permitted by the policy.

10. The system of claim 8, wherein the operational request comprises a write operation and granting the operational request comprises encrypting data with the encryption key and storing the encrypted data on the mobile storage means.

11. The system of claim 8, wherein the operational request comprises a read operation and granting the operational request comprises decrypting data stored on the mobile storage means.

12. The system of claim 8, wherein the operational request is selected from the group consisting of: mount operations, copy operations, delete operations, secure delete operations, read operations, write operations, transmit operations, and execute operations.

13. The system of claim 8, wherein the computing station is associated with a first security domain defining a first set of objects that are protected by a first cryptographic key; and wherein the computing station comprises a memory having stored thereon a first identifier identifying the first security domain; and further wherein the mobile storage means is associated with a second security domain defining a second set of objects that are protected by a second cryptographic key, and further wherein the mobile storage means stores a second identifier identifying the second security domain; and wherein the computing station is further configured to:
    compare the first and second identifiers; and
    deny the operational request if the first and second security domain do not identify the same security domain.

14. The system of claim 13, wherein the first identifier comprises a hash of the first security domain and the second identifier comprises a hash of the second security domain.

* * * * *